(12) United States Patent
Hori et al.

(10) Patent No.: US 7,817,746 B2
(45) Date of Patent: Oct. 19, 2010

(54) PEAK FACTOR REDUCTION UNIT AND BASEBAND SIGNAL PROCESSING DEVICE

(75) Inventors: Kazuyuki Hori, Tokyo (JP); Hideaki Arai, Yokohama (JP); Shouhei Murakami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 576 days.

(21) Appl. No.: 11/829,405

(22) Filed: Jul. 27, 2007

(65) Prior Publication Data
US 2008/0095284 A1    Apr. 24, 2008

(30) Foreign Application Priority Data
Oct. 18, 2006    (JP)    ............... 2006-283545

(51) Int. Cl.
*H04L 25/03* (2006.01)
(52) U.S. Cl. ..................................... 375/296
(58) Field of Classification Search ............... 375/295, 375/296, 297, 285
See application file for complete search history.

(56) References Cited

U.S. PATENT DOCUMENTS

| | | | |
|---|---|---|---|
| 5,490,172 A * | 2/1996 | Komara ............ | 375/296 |
| 6,449,302 B2 * | 9/2002 | Hunton ............ | 375/130 |
| 6,999,733 B2 | 2/2006 | Hori et al. | |
| 7,409,009 B2 * | 8/2008 | Akhtman ............ | 375/296 |
| 2004/0218689 A1 * | 11/2004 | Akhtman ............ | 375/296 |
| 2005/0163248 A1 * | 7/2005 | Berangi et al. ...... | 375/296 |

FOREIGN PATENT DOCUMENTS

JP    2003-124824    4/2003

OTHER PUBLICATIONS

"Noble Identical Transformation" http://adsp2191.hp.infoseek.co.jp/2191/program/polyphase/polyphase04.shtml, retrieval date Apr. 23, 2007.
"Filter Polyphase Analysis" :http://adsp2191.hp.infoseek.co.jp/2191/program/polyphase/phlyphase06.shtml, retrieval date Apr. 23, 2007.

* cited by examiner

*Primary Examiner*—Tesfaldet Bocure
(74) *Attorney, Agent, or Firm*—Brundidge & Stanger, P.C.

(57) ABSTRACT

A peak factor reduction unit that never allow peak factor reproduction even when interpolation is done in a succeeding stage. The unit detects a local maximum value of amplitude components from an input complex signal and supplies a complex signal that passes a band limiting baseband filter and an interpolation filter to a correction signal generation unit for generating a correction signal used for peak factor reduction and reduces a peak factor of the input complex signal with use of the correction signal generated from an interpolated complex signal.

11 Claims, 24 Drawing Sheets

US 7,817,746 B2

PEAK FACTOR REDUCTION UNIT AND BASEBAND SIGNAL PROCESSING DEVICE

CLAIM OF PRIORITY

The present application claims priority from Japanese application JP 2006-283545 filed on Oct. 18, 2006, the content of which is hereby incorporated by reference into this application.

FIELD OF THE INVENTION

The present invention relates to a peak factor reduction unit and a baseband signal processing device. More particularly, the present invention relates to a peak factor reduction unit and a baseband signal processing device preferred to a radio communication system for sending signals according to a normal distribution having a large peak factor, such as a base station of CDMA (Code-Division Multiple Access), OFDM (Orthogonal Frequency-Division Multiplexing), or the like.

BACKGROUND OF THE INVENTION

Radio communication techniques have been developed remarkably in recent years. Various modulation methods such as the third generation mobile communication system CDMA, the OFDM expected as the mainstream of the fourth generation communication systems, etc. have been proposed so as to improve the frequency utilization efficiency (bit transmission rate per unit frequency) and some of those methods are already put to practical use. In principle, each of those modulation methods improves the frequency utilization efficiency by multi-value processings of information to be set in each of the baseband I and Q signals that are complex signals. As a result, the distribution of the I and Q signals has comes to be close to the normal distribution and the peak factor (also referred to as the crest factor) of an amplitude component represented by a peak-to-average power ratio with respect to an average power becomes a value as large as 10 dB or over.

Generally, in a power amplifier provided in the final stage of a radio transmitter, a trade-off relationship is seen between the linearity of amplification characteristics and the power efficiency. In other words, while an output of a power amplifier cannot exceed the saturation output determined by the transistor performance, the power efficiency reaches its peak in the output around the saturation. This is why the output of the amplifier is required to increase more to improve the power efficiency.

However, upon saturation of a modulated signal by the non-linearity of such amplification characteristics, a non-linearity distortion power leaks to another frequency band adjacent to the allowed transmission frequency band. The leak of this non-linearity distortion power comes to disturb other communication systems that use adjacent frequency bands. Thus such non-linear distortion power leaks to adjacent frequency bands are strictly regulated by the radio regulations and electric wave laws and regulations. In the case of CDMA, OFDM, or the like, however, modulated signals are easily saturated due to a peak factor including high amplitude components, thereby it cannot be expected to increase the power amplifier output as described above so much.

In such a situation, a peak factor reduction unit is expected as an effective means for solving the trade-off problem as described above. There are various methods proposed for such a peak factor reduction unit. Generally, the peak factor reduction unit controls each waveform so that the peak amplitude is limited within a predetermined value while allowing slight degradation of the waveform quality for the baseband I and Q signals. The following three points are assumed as indicators of the performance to achieve the peak factor reduction described above.

(1) The peak amplitude should be limited within a threshold value preset as an allowable range.

(2) The baseband spectrum should not be spread.

(3) The waveform quality should be less degraded.

For example, JP-A No. 2003-124824 (patent document 1) discloses a conventional technique that satisfies all those performance indicators.

Hereunder, the conventional technique will be described briefly.

FIG. 16 shows a simple functional diagram of a peak factor reduction unit proposed in the patent document 1. A complex signal including I and Q components and supplied as a digital signal from an input port i1 is branched to the first and second paths.

The band of the complex signal in the first path is limited by a baseband filter Hz0 having a transmission function H(z), then inputted to a correction signal generation unit 100.

In the correction signal generation unit 100, the complex signal is divided into an amplitude component and a phase component by a complex-to-polar coordinates conversion unit CP1, then output as an amplitude component sample sequence and a phase component sample sequence. The amplitude component sample sequence is inputted to a dead zone circuit DZ1 and an amplitude value (sample value) that exceeds a preset allowable range is detected. The sample value detected in the dead zone circuit DZ1 is multiplied by a predetermined gain in a gain block g0. This gain is set at a reciprocal of the maximum value of a coefficient (usually a tap coefficient center) of the baseband filter Hz0, thereby a sample value denoting a normalized exceeding amplitude value is obtained from the gain block g0.

The sample value output from the gain block g0 is inputted to a local maximum value detection unit 200 consisting of delay units D1 and D2, comparators LT1 and GT1, and a multiplier P1 respectively. In this local maximum value detection unit 200, the sample sequence output from the gain block g0 is branched into two paths and one of the branched sample sequences is delayed in the delay units D1 and D2 connected serially to each other so as to obtain three temporary consecutive samples one after another. The samples are an output sample of the gain block g0, an output sample of the delay unit D1, and an output sample of the delay unit D2.

The comparator LT1 compares the value in the delay unit D1 with an output of the delay unit D2 and outputs "1" for a period of "D2 output<D1 output" and "0" for other cases to the multiplier P1. The comparator GT1 compares an output of the gain block g0 with an output of the delay unit D1 and outputs "1" for a period of "D1 output>g0 output" and "0" for other cases to the multiplier P1. The multiplier P1 multiplies an output of the delay unit D1 by outputs of the comparators LT1 and GT1. Consequently, the multiplier P1 outputs an output value of the delay unit D1 as an impulse signal when the outputs of both the comparators LT1 and GT1 are "1", that is, when the output sample of the delay unit D1 is a local maximum value larger than both preceding and succeeding samples.

The output of the local maximum value detection unit 200 (output of the multiplier P1) is supplied as an amplitude component signal to the polar-coordinates-to-complex conversion unit PC1. Because the processing delay of the signal in the local maximum value detection unit 200 is one sample, the phase component signal output from the polar-coordinates-to-complex conversion unit PC1 is also delayed by one sample in the delay unit D3 and supplied to the polar-coordinates-to-complex conversion unit PC1. The polar-coordinates-to-complex conversion unit PC1 converts both amplitude and phase components into a complex signal and supplied the signal to the subtraction unit SU1 as a correction signal used for peak factor reduction.

On the other hand, each input signal to the second path is delayed by a group delay having a transmission function H(z) of the baseband filter Hz0 in the delay unit D4, then supplied to the subtraction unit SU1 through the delay unit D0 having a delay time set in the correction signal generation unit 100, that is, a delay time of one sample generated in the local maximum value detection unit 200 in this example. The subtraction unit SU1 subtracts a correction signal output from the correction signal generation unit 100 from the complex signal output from the delay unit D0 and outputs a peak factor reduced signal. Then, the band of the signal is limited in the baseband filter Hz2, thereby obtaining a peak factor reduced baseband signal at an output port o2.

Here, the polar-coordinates-to-complex conversion unit PC1 outputs a correction signal (injected signal) generated for peak factor reduction. This output signal, when added to a complex input signal in the subtraction unit SU1 (minus addition), comes to cause degradation of the signal quality. However, because the correction signal is generated like an impulse and reaches its local maximum value when an amplitude component exceeds the allowable range, as well as because the energy is concentrated around the peak, the waveform quality degradation is minimized. In principle, the spectrum does not spread, since the band of the output signal of the subtraction unit SU1 is limited in the baseband filter Hz2.

In FIG. 16, Hz1 denotes a baseband filter provided to observe the waveform of an input signal of which peak factor is not reduced at the output port o1. Hz3 denotes a baseband filter provided to observe the waveform of an injection signal to be added to an input signal i1 for peak factor reduction at the output port o3. Those filters are not required necessarily for the peak factor reduction unit.

Hereunder, a simulation result will be described. The simulation is carried out with use of virtual parameters, that is, input I and Q signals assumed as complex random signals in accordance with the normal distribution of the sampling frequency 10 MHz, a cut-off frequency of each of the baseband filters H (z) (Hz0 and Hz2) as 4 MHz, and a peak factor limit value as 8 dB.

In FIG. 17A, a solid line denotes a frequency response of a baseband filter (z) and FIG. 17B shows an impulse response of a baseband filter. The parameters shown here are values set just for description; they do not mean those of a specific system.

FIGS. 18A and 18B show waveform amplitudes obtained in the simulation.

FIG. 18A shows a waveform of a signal of which peak factor is not reduced and observed at the output port o1 and FIG. 18B shows a waveform of a signal of which peak factor is reduced and observed at the output port o2. A broken line denotes an upper limit of an allowable range set in the dead zone circuit DZ1. In FIG. 18B, it is confirmed that the output port o2 outputs a signal of which amplitude is limited within a set value due to an executed peak factor reduction processing.

FIG. 19A shows a CCDF (Complementally Cumulative Distribution Function) for representing the frequency distribution of the peak signal. As seen in the spectrum shown in FIG. 19A, a correction signal observed at the output port o3 is masked completely by a signal observed at the output port o1 and not reduced in peak factor. Consequently, if this correction signal is used for peak factor reduction, the output port o2 can output a signal having no spread in its spectrum.

As seen in the CCDF shown in FIG. 19B, the signal observed at the output port o1 and not reduced in peak factor has a peak factor of 10 dB or over while the output port o2 outputs a signal of which peak factor is limited to about 8 dB. This means that execution of the peak factor reduction as described above makes it possible to increase the output to 8 dB of the saturation of the subject power amplifier, thereby the output can be increased by 2 dB even when the upper limit output from the original input signal is only 10 dB or under of the saturation output of the power amplifier. The waveform quality degradation in the above simulation is limited only to 1.3% in terms of the EVM (Error Vector Magnitude). Thus the quality degradation could be said extremely low.

SUMMARY OF THE INVENTION

The above peak factor reduction is carried out in a digital signal processing stage and a D/A converter and an analog filter for eliminating an alias image that is a turnaround frequency component are required in a subsequent stage of the peak factor reduction unit so as to send a peak factor reduced signal as a radio communication signal. Particularly, if an input signal to an input port i1 is a wide band signal, the input signal baseband comes close to that of the alias image on the frequency axis. Thus sharp cut-off characteristics are required at a phase boundary between the baseband and the alias image to eliminate the alias image.

Generally, however, the sharper the cut-off characteristics is, the higher the filter order becomes. The filter designing becomes difficult. In addition, this case also includes a problem that the filter phase characteristics become unstable significantly around the cut-off. In the case of a voice transmission signal, the phase characteristics are not considered seriously so much. In the field of general digital communications, a phase distortion causes serious degradation of the waveform quality, so that it must be avoided as possible as can.

To ease the specifications of an analog filter, for example, interpolation is effective. The interpolation is often employed in the field of digital Hi-Fi audio. According to this method, O-insertion is made for each input signal, then the signal is over-sampled. After that, the waveform of the signal is smoothed by a linear phase type digital interpolation filter, then subjected to a high speed D/A conversion process. As a result, the alias image is separated far from the baseband. And now, the alias image eliminating analog filter can be selected freely from any of those that are slow in cut-off characteristics, simple in configuration, and less distorted in low orders. In spite of this, if a peak factor reduced signal is interpolated, the interpolation filter functions to generate a new problem that a once-deleted peak is reproduced.

FIG. 20 shows a block diagram of the peak factor reduction unit shown in FIG. 16 upon over-sampling of its output. Here, a description will be made for a result of simulation in which a peak factor reduced signal output from the baseband filter Hz2 is interpolated by four times the an over sampler ovs2, then the signal waveform is smoothed in the interpolation filter Gz2 and output to the port o2. To enable a comparison with the output signal of the port o2, the baseband filters Hz1 and Hz3 are also connected to the over-samplers ovs1 and ovs3 and to the interpolation filters Gz1 and Gz3 respectively.

An interpolation filter having a transmission function G(z) shown with a broken line in FIG. 17A is used for each of those interpolation filters in this embodiment. FIG. 17C shows an impulse response of the interpolation filter corresponding to the baseband filter shown in FIG. 17B.

FIG. 21A shows an amplitude of a waveform of a signal output from the port o1 shown in FIG. 20 and FIG. 21B shows an amplitude of a waveform of a signal output from the port o2. As shown clearly in FIG. 21B, a signal that passes an interpolation filter generates a peak factor over an allowable range. FIGS. 22A and 22B show a power spectrum and CCDF obtained from those waveforms. As shown in the comparison result in FIG. 19, it is recognized that the CCDF is broken at the output of the port o2 due to the interpolation while the spectrum is normal.

FIG. 23 is a diagram of a waveform obtained by expanding a portion around a peak in an output signal waveform after ending the interpolation process shown in FIG. 21B. Each circle marker (o) denotes a sample point before interpolation is performed. Each dot marker (.) denotes a sample point after the interpolation process. Each broken line denotes an upper limit of an allowable amplitude range. Every sample point (o) before the interpolation process is in the allowable range. However, it will be understood that the interpolation causes appearance of a peak amplitude over the limit value. Because peak reproduction never occurs only with zero insertion in the over-sampler ovs2, it is clear that the peak factor over the allowable range is caused by the function of the interpolation filter.

In recent years, some radio communication D/A conversion ICs have come to appear on the market. They are, for example, DAC5687 of Texas Instruments Inc., and AD8778 of Analog Devices Inc. Each of those ICs incorporates interpolation functions. In each of those ICs, the sample rate can be raised up to eight times in maximum with use of the over-sampler and the interpolation filter built therein. Using such a D/A conversion IC makes it possible to omit providing the baseband signal processing device with those interpolation functions required for high sample rate signal processings. Thus the designing and manufacturing costs of the object radio communication unit are reduced.

However, as described above, the conventional peak factor reduction unit cannot prevent the interpolation filter from reproducing a peak signal over the amplitude limit value in interpolation carried out to ease the specifications of an analog filter, thereby resulting in losing of the peak factor reduction effect. Consequently, the conventional peak factor reduction unit cannot use the interpolation functions built in the above described D/A conversion IC in its succeeding stage. This has been a problem.

Under such circumstances, it is the first object of the present invention to provide a peak factor reduction unit that does not lose the peak factor reduction effect even in such an interpolating process, as well as to provide a baseband signal processing system that uses the peak factor reduction unit.

It is the second object of the present invention to provide another peak factor reduction unit that can execute most of signal processings required for peak factor reduction at a low speed and never lose the peak factor reduction effect, as well as to provide another baseband signal processing device that uses the peak factor reduction unit.

It is the third object of the present invention to provide still another peak factor reduction unit connectable to an interpolation function built-in type D/A conversion IC.

In order to achieve the first object, the peak factor reduction unit includes a first path including a correction signal generation unit for generating a correction signal used for peak factor reduction from a complex signal (I and Q signals) supplied as a digital signal; a second path including a delay unit used for timing adjustment; and a subtraction unit for subtracting the correction signal from the complex input signal branched to the first and second paths, then passed through the delay unit respectively, thereby outputting a complex signal of which peak factor is reduced within an allowable range.

More concretely, the correction signal generation unit is supplied a complex signal that has passed a band limiting baseband filter and an interpolation filter respectively, then generates a correction signal used for peak factor reduction from an interpolated complex signal and the subtractor reduces the peak factor of the complex input signal according to the correction signal output from the correction signal generation unit.

In a first embodiment of the present invention, the first path includes a first baseband filter for limiting a band of a complex input signal supplied to the correction signal generation unit; a first over-sampler for multiplying the number of samples of the complex input signal of which band is limited by the first baseband filter by (n) times (n>2); and an interpolation filter paired with the first over-sampler. The second path includes a second over-sampler for multiplying the number of samples of the complex input signal by (n) times.

According to the configuration in the second embodiment, the correction signal generation unit generates a correction signal used for peak factor reduction from an interpolated complex signal and the subtraction unit reduces the peak factor of the interpolated input signal with use of this correction signal. Thus the number of samples is already increased for each output signal of the subtraction unit. Consequently, the baseband filter limits the band of the peak factor reduced signal, so that no peak factor over the allowable range is reproduced even when the signal passes the interpolation filter provided in a succeeding stage.

In order to achieve the above second object, the peak factor reduction unit of the present invention transforms the interpolation filter to an L-phase polyphase structured one by applying filter polyphase resolution to the filter in accordance with the noble identical transformation to realize peak factor reduction. Adopting such a polyphase structure makes it possible to execute most of peak factor reduction processings except for some of delay and addition processings at a low sample rate before the interpolation processing.

The noble identical transformation means a transformation principle for denoting that a structure in which an L-time over-sampler is connected after a filter having a transmission function G(z) and a structure in which a filter having a transmission function $G(z^L)$ is connected after an L-time over-sampler are equal in function and they can be replaced mutually ("Noble Identical Transformation": http://adsp2191.hp.infoseek.co.jp/2191/program/polyphase/polyphase04.shtml). The transmission function $G(z^L)$ means a processing of a signal for every L-th sample while the transmission function G(z) processes a signal for each sample.

In the case of the filter polyphase resolution, such noble identical transformation is applied to substitute the functions of a filter consisting of many taps for a filter consisting of less taps as to be described below.

In case where an FIR (Finite Impulse Response) filter Gz0 having a transmission function G(z) like tap coefficients g0, g1, g2 ... is connected after an over-sampler ovs5 as shown in FIG. 23A, every L-th tap coefficient of the G(z) is collected and resolved into plural transmission functions G1(zL), G2(zL), ..., GN(zL) as shown in the following expression.

In this state, the over-sampler and the parts of G1(zL), G2(zL), ..., GL(zL) are subjected to noble identical transformation, thereby plural filters, each having one of the transmission functions G1(zL), G2(zL), ..., GL(zL) can be disposed before an over-sampler.

$$G_1(z^L) = g_0 + g_L z^{-L} + g_{2L} z^{-2L} + \ldots \ G_2(z^L)$$
$$= g_1 + g_{L+1} z^{-L} + g_{2L+1} z^{-2L} + \ldots \ G_3(z^L)$$
$$= g_2 + g_{L+2} z^{-L} + g_{2L} + z^{-2L} + \ldots$$
$$\vdots \qquad \vdots$$
$$\vdots \qquad \vdots$$
$$G_L(z^L) = g_{L-1} z^{-(L-1)} + g_{2L-1} z^{-(2L-1)} +$$
$$g_{3L-1} z^{-(3L-1)} + \ldots \ G(z)$$
$$= G_1(z^L) + G_2(z^L) z^{-1} +$$
$$G_3(z^L) z^{-2} + \ldots + G_L(z^L) z^{-(L-1)}$$

FIG. 24B shows a filter having a polyphase structure of L=4. The polyphase resolution makes it possible to realize plural filters (Gz01 to Gz04 in FIG. 24) corresponding to the transmission functions G1(z), G2((z), ..., GL(z) at a low sample rate except for the delay units z-1, z-2, ..., z-(L-1) (D1 to D3 in FIG. 24) and one addition unit AD. The polyphase filters realized by polyphase resolution such way are described in "Filter Polyphase Analysis" http://adsp2191.hp.infoseek.co.jp/2191/program/polyphase/polyphase06.sthml.

In order to achieve the above third object, in the peak factor reduction unit of the present invention, the first path includes a first baseband filter for limiting a band of a complex input signal supplied to the correction signal generation unit and an n-phase interpolation filter having a polyphase structure and the correction signal generation unit is divided into plural n-phase correction signal generation units, each being connected to one of the plurality of interpolation filters in each phase of the polyphase structure. An n-phase correction signal generated in each of the plurality of correction signal generation units is given an appropriate fractional delay time that differs among phases and inputted to a digital filter in which n-phase correction signals are synthesized into one correction signal. Each synthesized correction signal output from the digital filter is supplied together with an output signal of the second path to the subtraction unit.

Providing such a digital filter in the final stage of the polyphase structure will make it possible to use a low sample rate assumed before execution of interpolation for all of the processings of the n-phase interpolation filters, as well as filter output delay and addition processings required for the polyphase structure.

According to the above configuration, an over-sampler can be disposed in a succeeding stage of a peak factor reduction unit. The over-sampler can thus be connected to an interpolation functions built-in type D/A conversion IC.

According to an embodiment of the present invention, therefore, the peak factor reduction effect is not lost even upon execution of interpolation. So, occurrence of phase distortions in an alias image eliminating analog filter is reduced. In addition, in case where the polyphase structure is employed for the interpolation filter, peak factor reduction is realized at a low sample rate, thereby realizing a peak factor reduction unit employable for the interpolation functions built-in type D/A conversion IC as described above.

DETAILED DESCRIPTION OF THE PREFERRED EMBODIMENTS

Hereunder, the preferred embodiments of the present invention will be described with reference to the accompanying drawings.

First Embodiment

Figure 1:
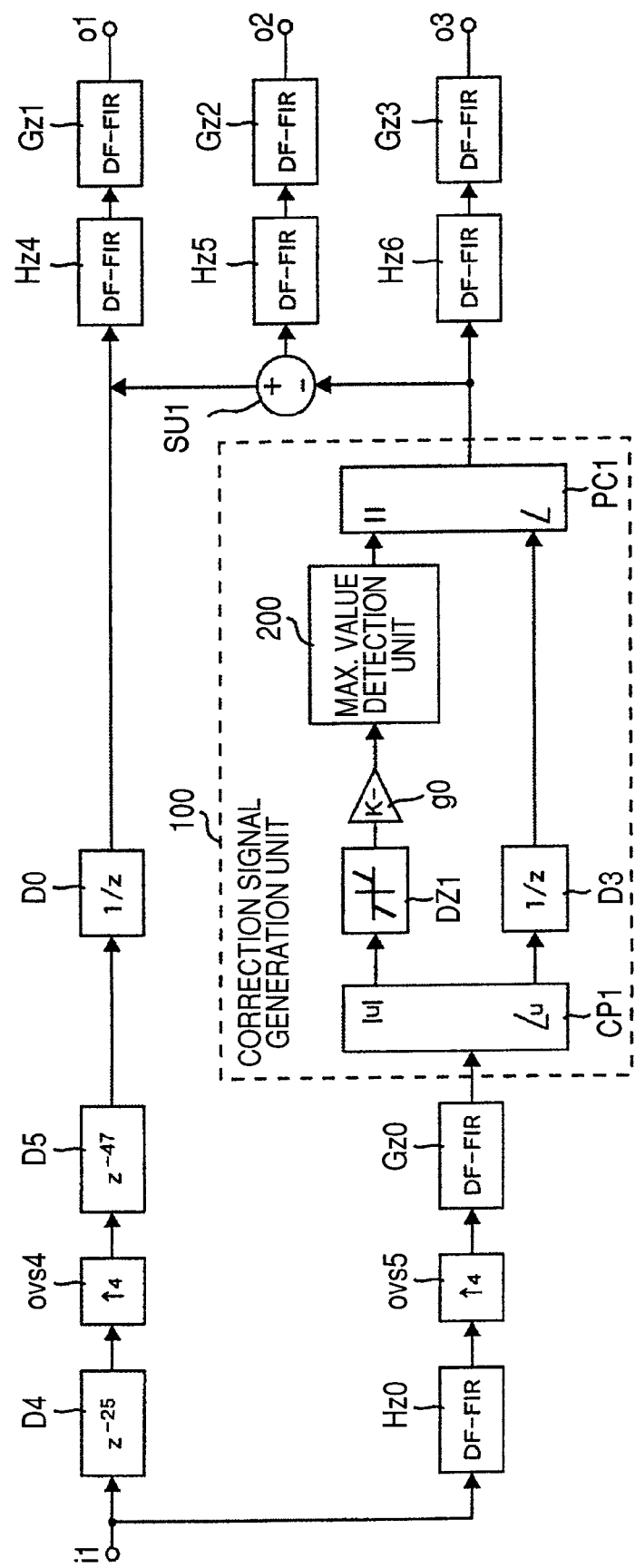
FIG. 1 is a block diagram of a peak factor reduction unit in a first embodiment of the present invention.

FIG. 1 shows a peak factor reduction unit in a first embodiment of the present invention. In FIG. 1, the same reference numerals will be used for the same components as those in a conventional peak factor reduction unit shown in FIGS. 16 and 20, avoiding redundant description. The configuration of the local maximum value detection unit 200 is the same as that shown in FIG. 16, so that its description will also be omitted here.

This first embodiment is characterized in that interpolation is completed before peak factor reduction is carried out in a subtraction unit SU1 so as to prevent peak reproduction to be caused by an interpolation filter Gz2. In the peak factor reduction unit in this first embodiment, an over-sampler ovs5 and an interpolation filter Gz0 are disposed between a baseband filter Hz0 and a correction signal generation unit 100 provided in the first path and an interpolation processing is carried out just after the band of an object input signal is limited in the filter Hz0.

The polar-coordinates-to-complex CP1 receives a peak reproduced complex signal, that is, a signal in which a zero value sample is inserted by the over-sampler ovs5 and the sample value is interpolated by the interpolation filter Gz0. Consequently, a dead zone circuit DZ1 to which input signal amplitude components are supplied comes to detect sample values exceeding an allowable range more than any conventional units. Those sample values are normalized in a gain block g0, then inputted to a local maximum value detection unit 200.

Figure 23:
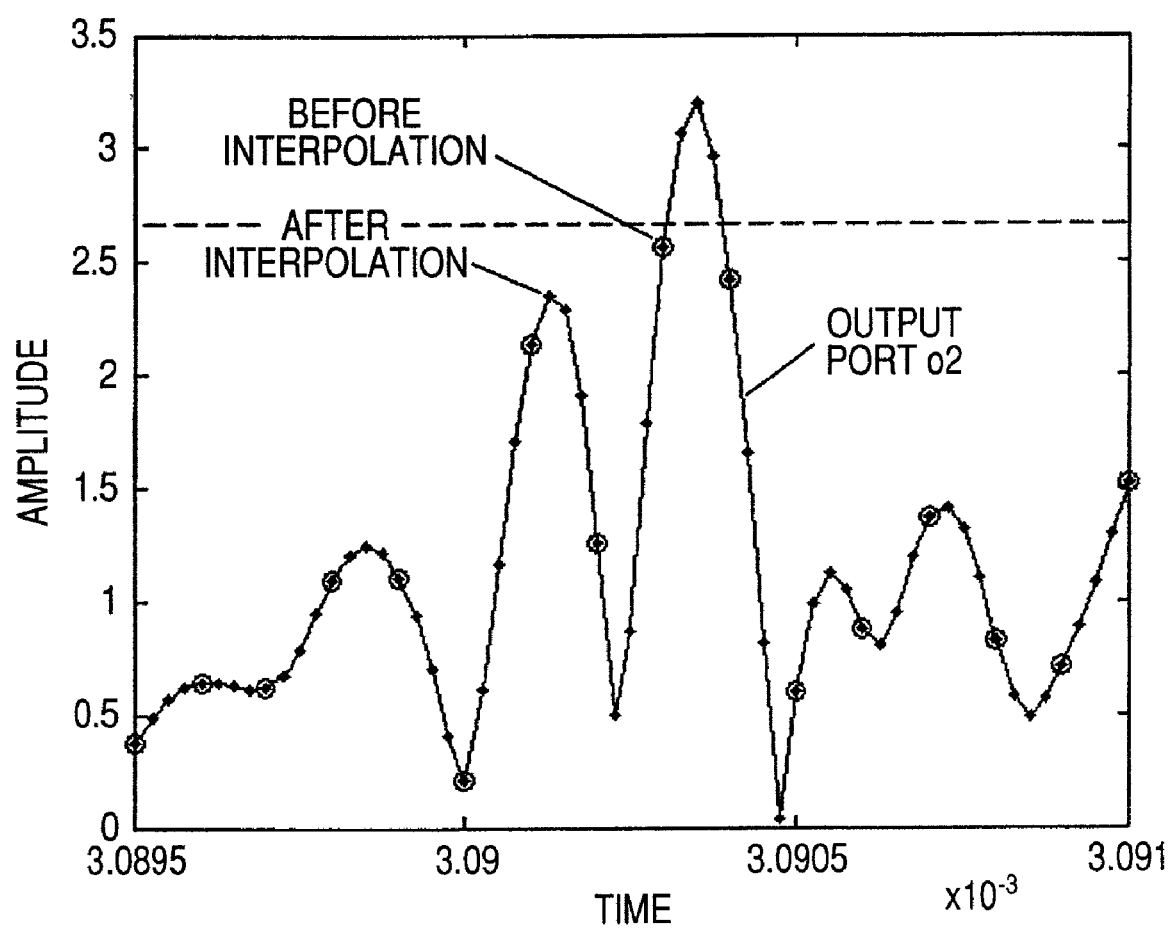
FIG. 23 is a diagram for showing an waveform expanded from a portion around a peak in an output signal waveform after execution of an interpolation processing shown in FIG. 21B.

The local maximum value detection unit 200 detects a local maximum sample value from among interpolated sample values over an allowable range and assumes the detected sample value as an impulse signal to be supplied to the polar-coordinates-to-complex conversion unit PC1. Consequently, the local maximum value detection unit 200 detects, for example, a sample equivalent to a peak denoted with a dot marker in FIG. 23 and supplies the sample to the polar-coordinates-to-complex conversion unit PC1.

The over-sampler ovs4 is disposed between the delay units D4 and D0 of the second path and a delay unit D5 is added to the second path to match the output of the polar-coordinates-to-complex conversion unit PC1 with the sample rate. The delay unit D5 has the same delay time as a delay time generated in the interpolation filter Gz0.

Figure 20:
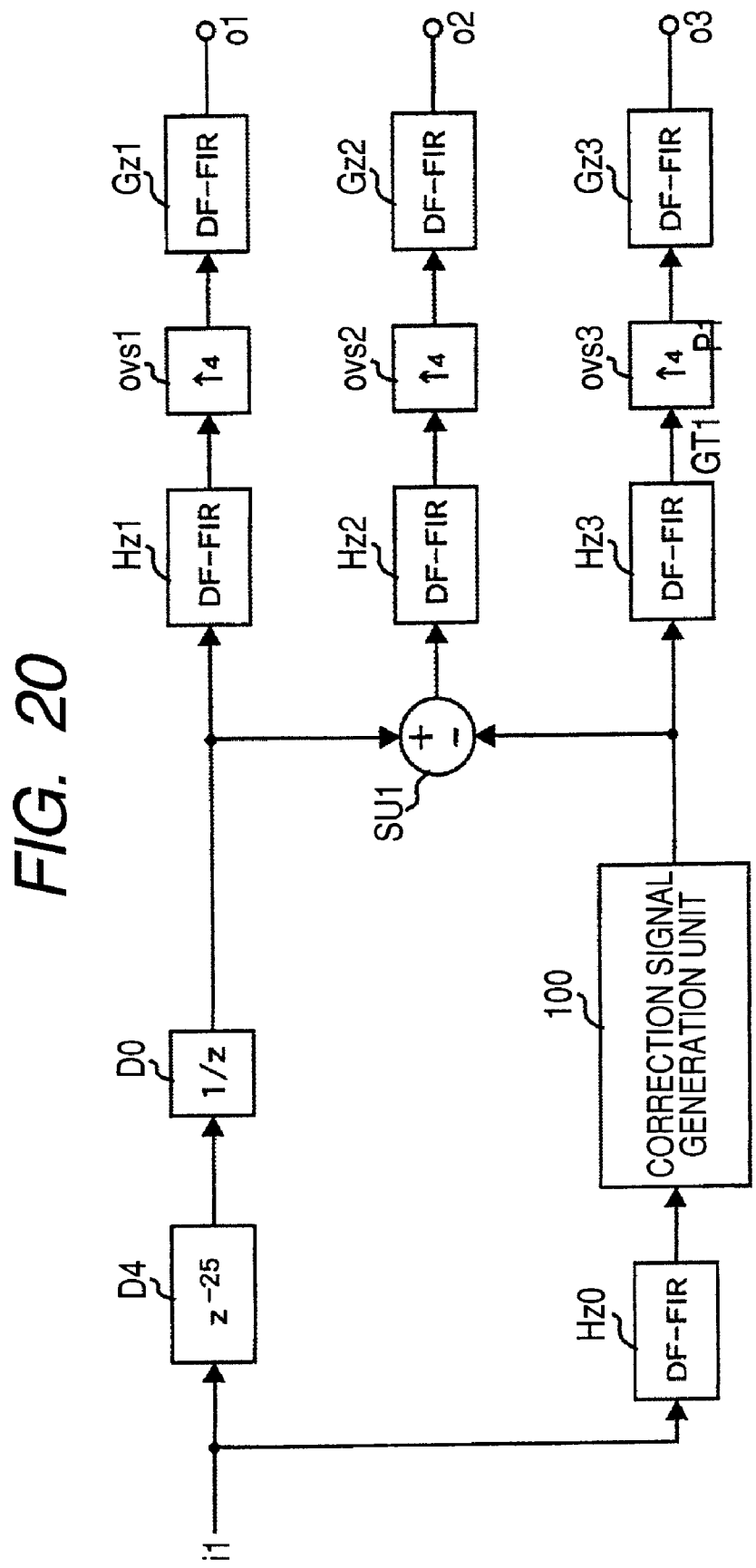
FIG. 20 is a block diagram for over-sampling an output signal of the peak factor reduction unit shown in FIG. 16.
Figure 21A:
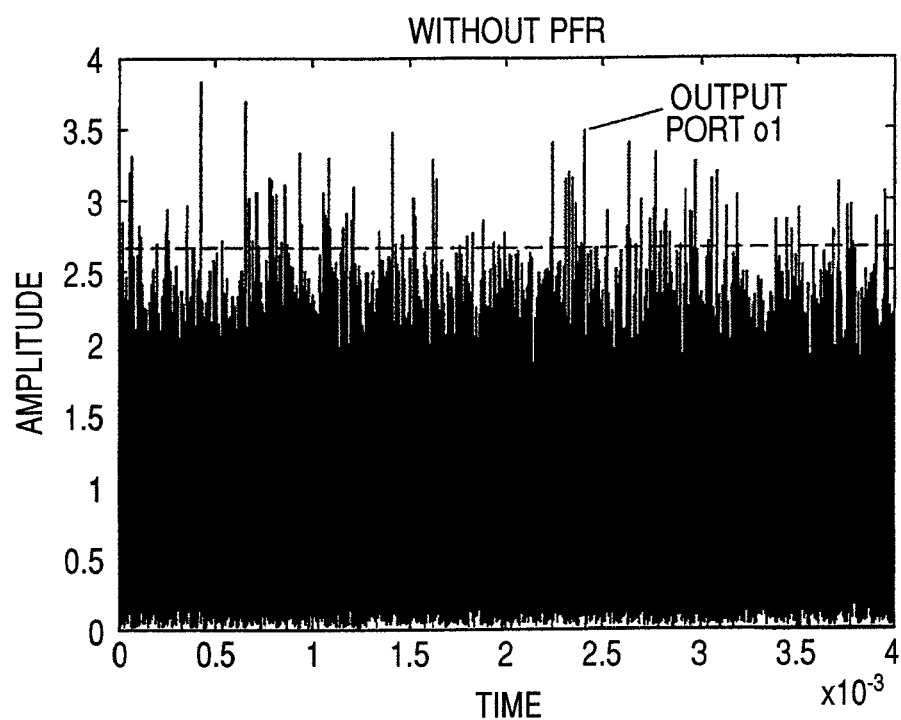
FIG. 21A is a diagram for showing a waveform of a waveform observed at the output port o1 shown in FIG. 20 and not reduced in peak factor.
Figure 21B:
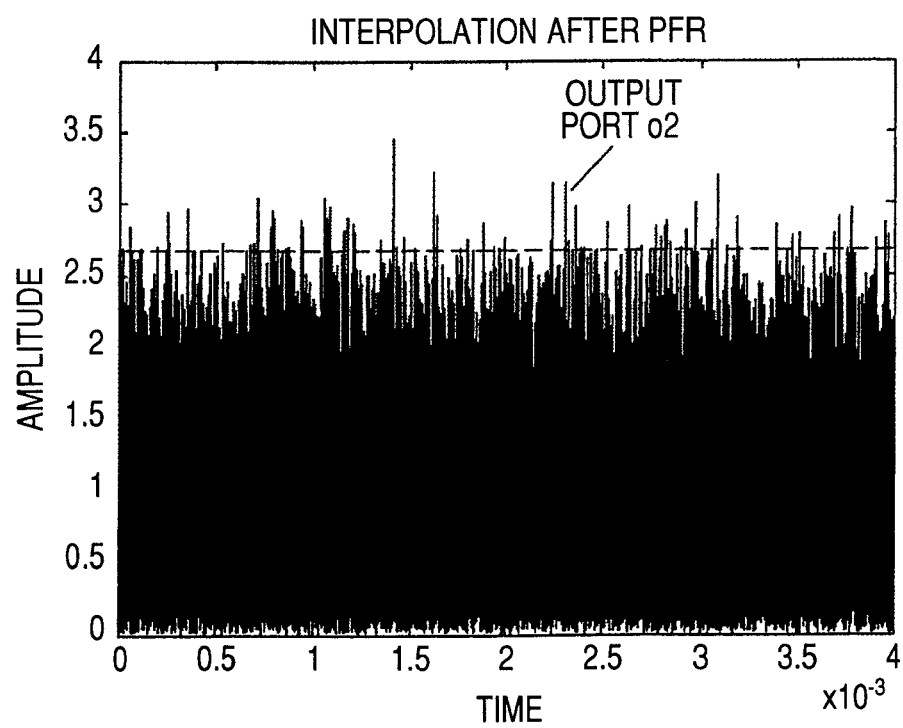
FIG. 21B is a diagram for showing a waveform of a signal observed at the output port o2 shown in FIG. 20 and reduced in peak factor.
Figure 22A:
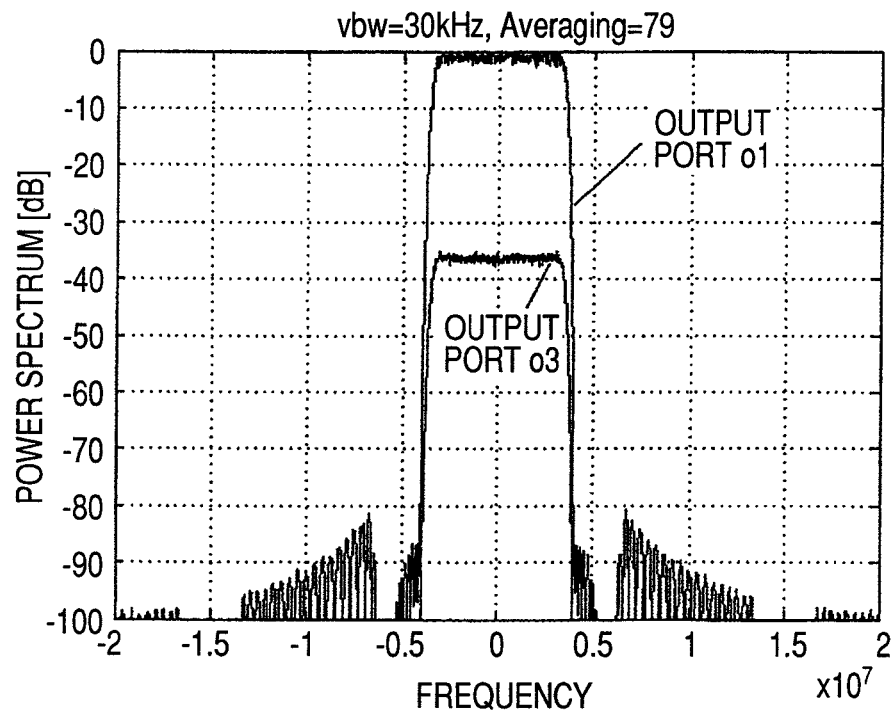
FIG. 22A is a diagram for showing power spectra of a waveform of a signal and a waveform of an injected signal observed at the output ports o1 and o3 shown in FIG. 20 and not reduced in peak factor respectively.
Figure 22B:
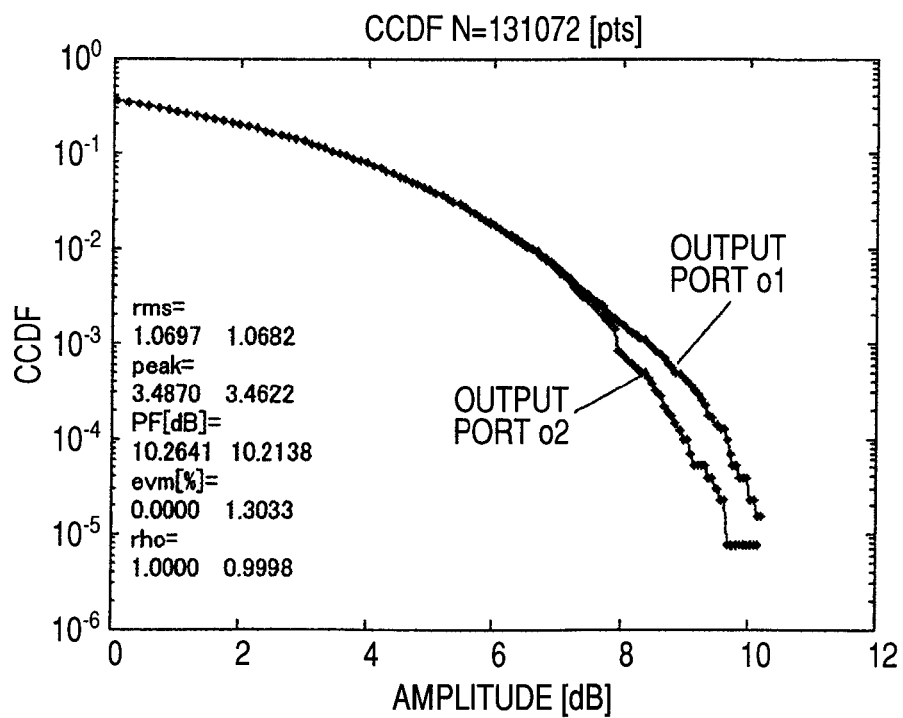
FIG. 22B is a diagram for showing a CCDF observed at each of the output ports o1 and o2 shown in FIG. 20.

The positions of the baseband filter used to limit the band of the output signal from the subtraction unit SU1 and the over-sampler are reversed from those shown in FIG. 20. This is why a filter Hz5 having a transmission function H(z4) is used according to the noble identical transformation principle. The filter having the transmission function H(z4) is also used for the baseband filter Hz4 for observing each input signal of which peak factor is not reduced at the output port o1 and for the baseband filter Hz6 for observing each injected signal at the output port o3.

Figure 2A:
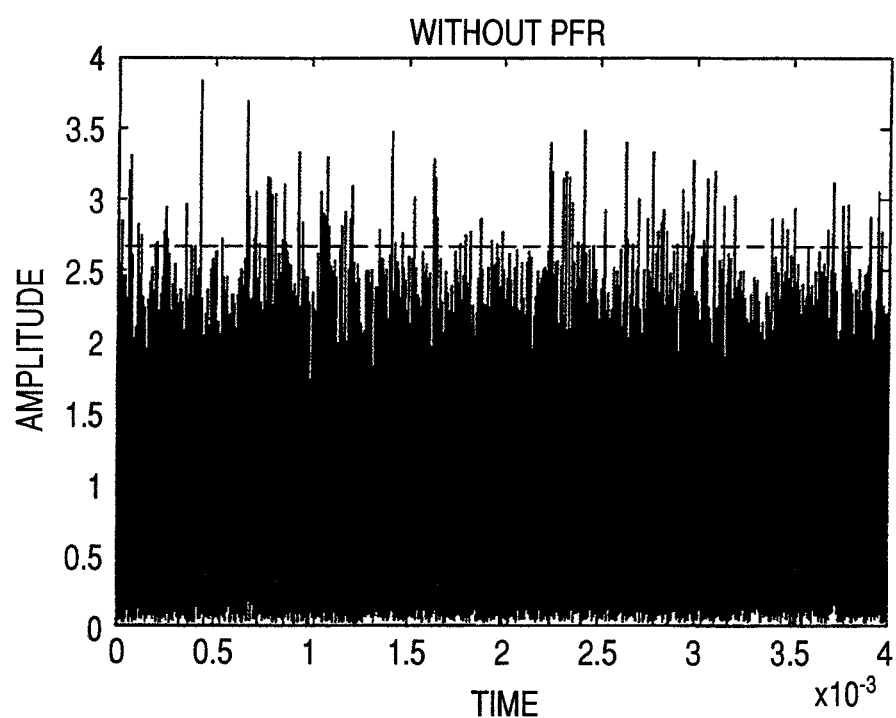
FIG. 2A is a diagram for showing a waveform of a signal observed at an output port o2 and not reduced in peak factor in the peak factor reduction unit in the first embodiment of the present invention.
Figure 2B:
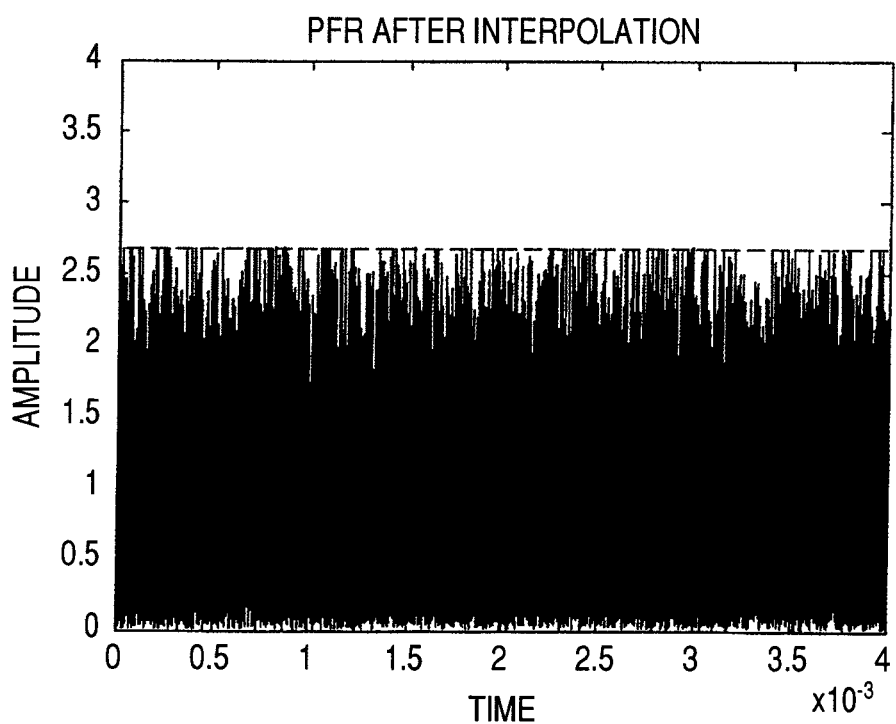
FIG. 2B is a diagram for showing a waveform of a signal observed at an output port o2 and reduced in peak factor in the peak factor reduction unit in the first embodiment of the present invention.

FIGS. 2A and 2B show diagrams for showing an output waveform amplitude simulated in the peak factor reduction unit in this first embodiment respectively. FIG. 2A shows a waveform of a signal observed at the output port o0 and not reduced in peak factor and FIG. 2B shows a waveform of a signal observed at the output port o2 and reduced in peak factor.

According to this first embodiment, because peak factor reduction is carried out for interpolated input signals, no peak signals over an allowable range are reproduced as shown with a signal waveform in FIG. 2B even when a signal of which band is limited in the baseband filter Hz5 is smoothed in the second interpolation filter Gz2.

Figure 3A:
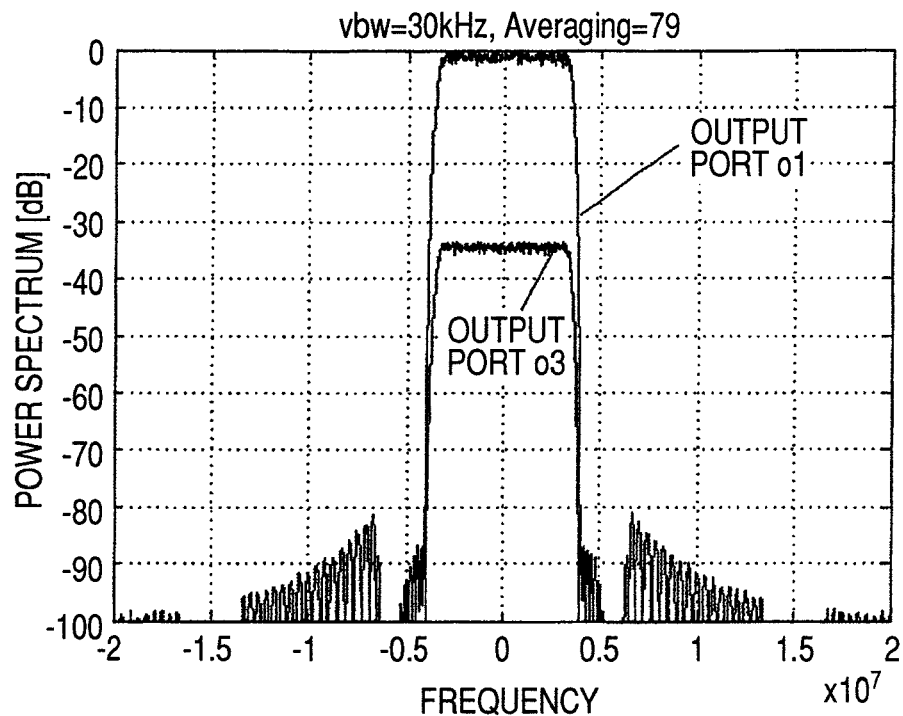
FIG. 3A is a diagram for showing power spectra of waveforms of signals observed at output ports o1 and o3 and not reduced in peak factor in the peak factor reduction unit in the first embodiment of the present invention.
Figure 3B:
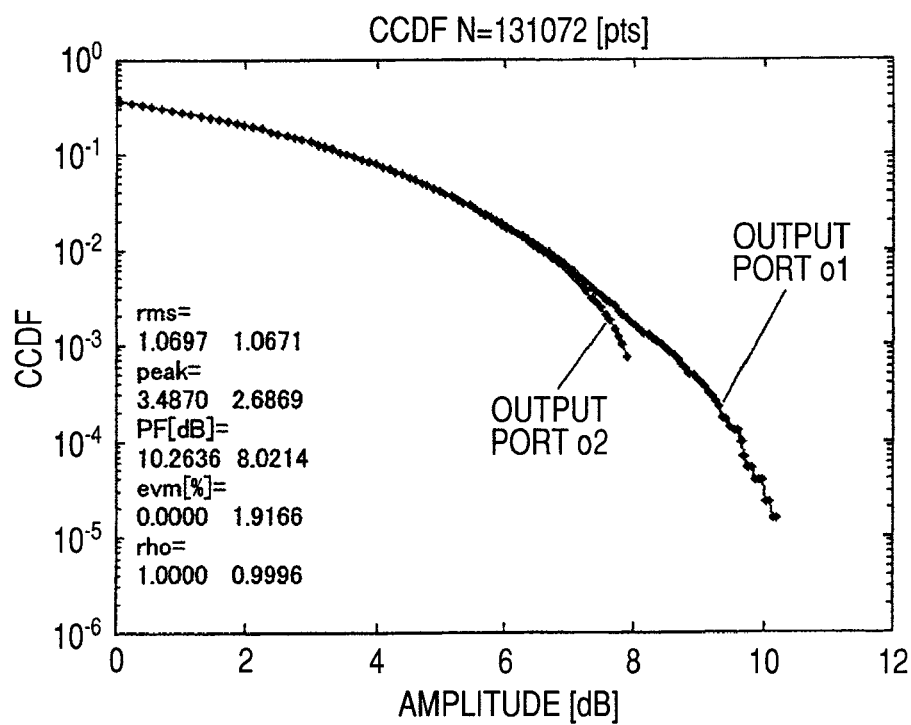
FIG. 3B is a diagram for showing CCDFs observed at output ports o1 and o2 in the peak factor reduction unit in the first embodiment of the present invention.

FIG. 3A shows a power spectrum of a waveform of a signal observed at the output port o1 and not reduced in peak factor, as well as a power spectrum of a waveform of an injected signal observed at the output port o2. FIG. 3B shows a CCDF in a signal output from each of the output ports o1 and o2.

As shown clearly in FIG. 3A, according to this first embodiment, the power spectrum of the correction signal observed at the output port o3 is masked completely by the power spectrum of the signal observed at the output port o1 and not reduced in peak factor. It would be understand that if this correction signal is used for peak factor reduction, the output port o2 outputs a signal having no spectrum spread. As shown in FIG. 3B, according to this first embodiment, it would be understood that the output port o2 outputs a signal of which peak factor is limited within 8 dB that is an allowable range value.

Figure 24A:
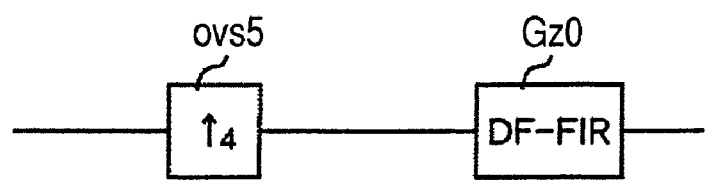
FIG. 24A is a block diagram of a connection between an over-sampler ovs5 and an interpolation filter Gz0 (A)
Figure 24B:
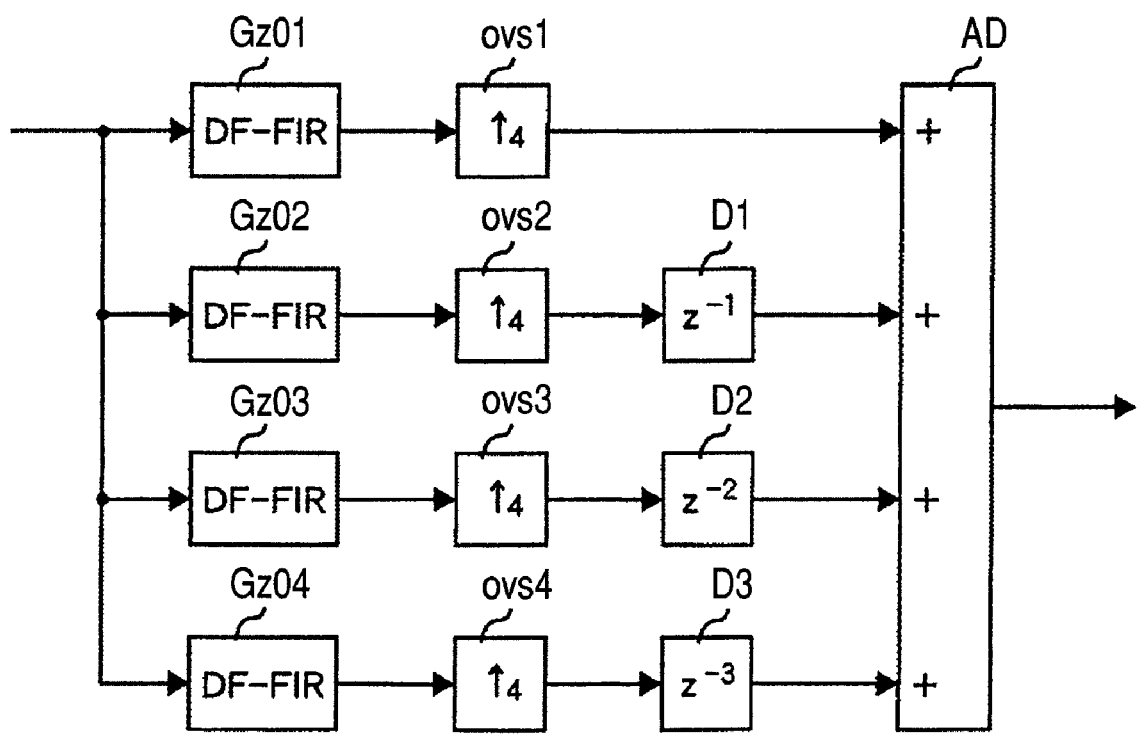
FIG. 24B is a block diagram of a polyphase structured filter.

The over-sampler ovs5 and the interpolation filter Gz0 shown in FIG. 1 can be transformed so as to have a polyphase structure as shown in FIG. 24B by applying polyphase resolution processing to them.

Second Embodiment

Figure 4:
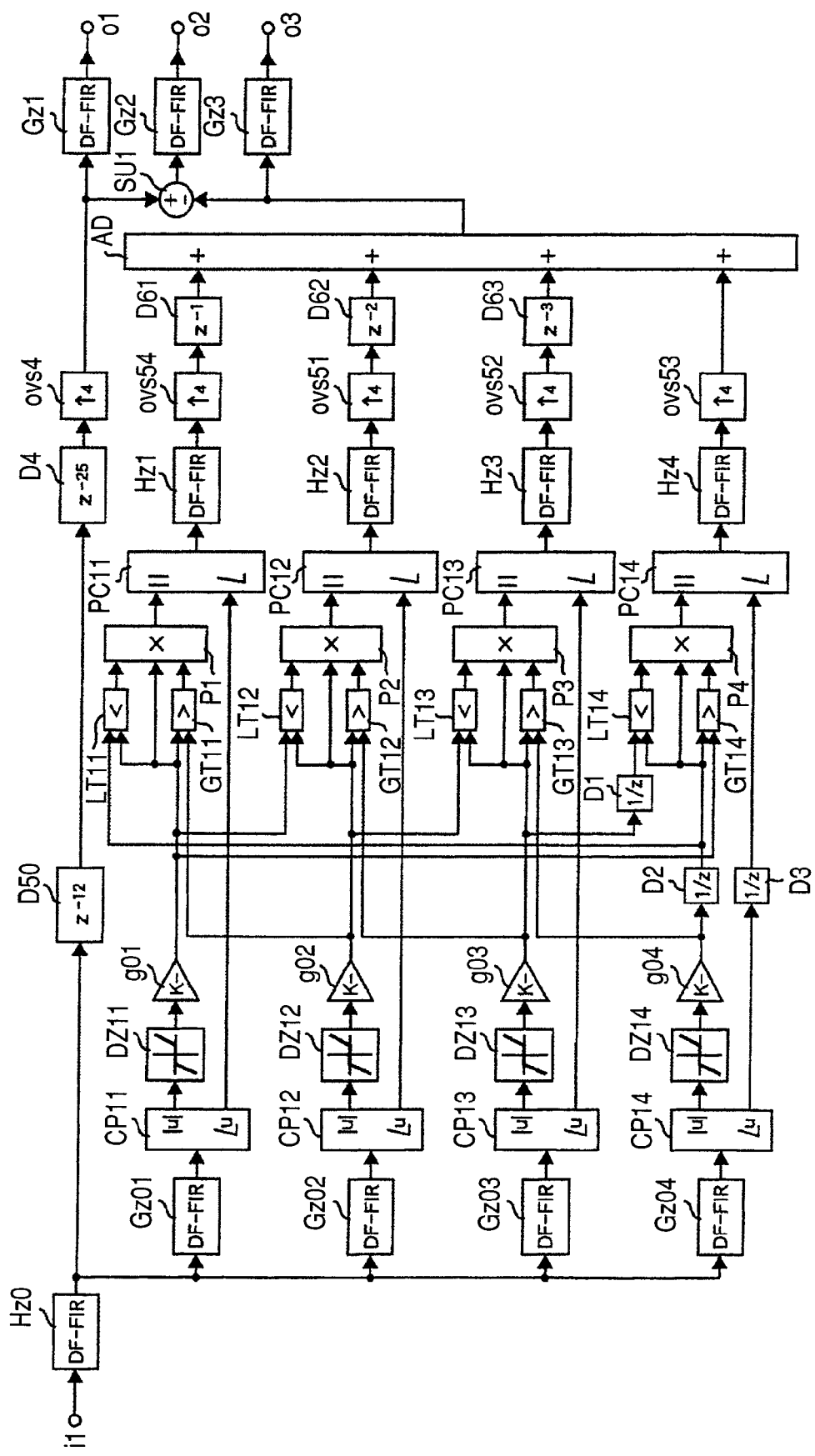
FIG. 4 is a block diagram of a peak factor reduction unit in a second embodiment of the present invention.

FIG. 4 shows a peak factor reduction unit in a second embodiment of the present invention.

Figure 5:
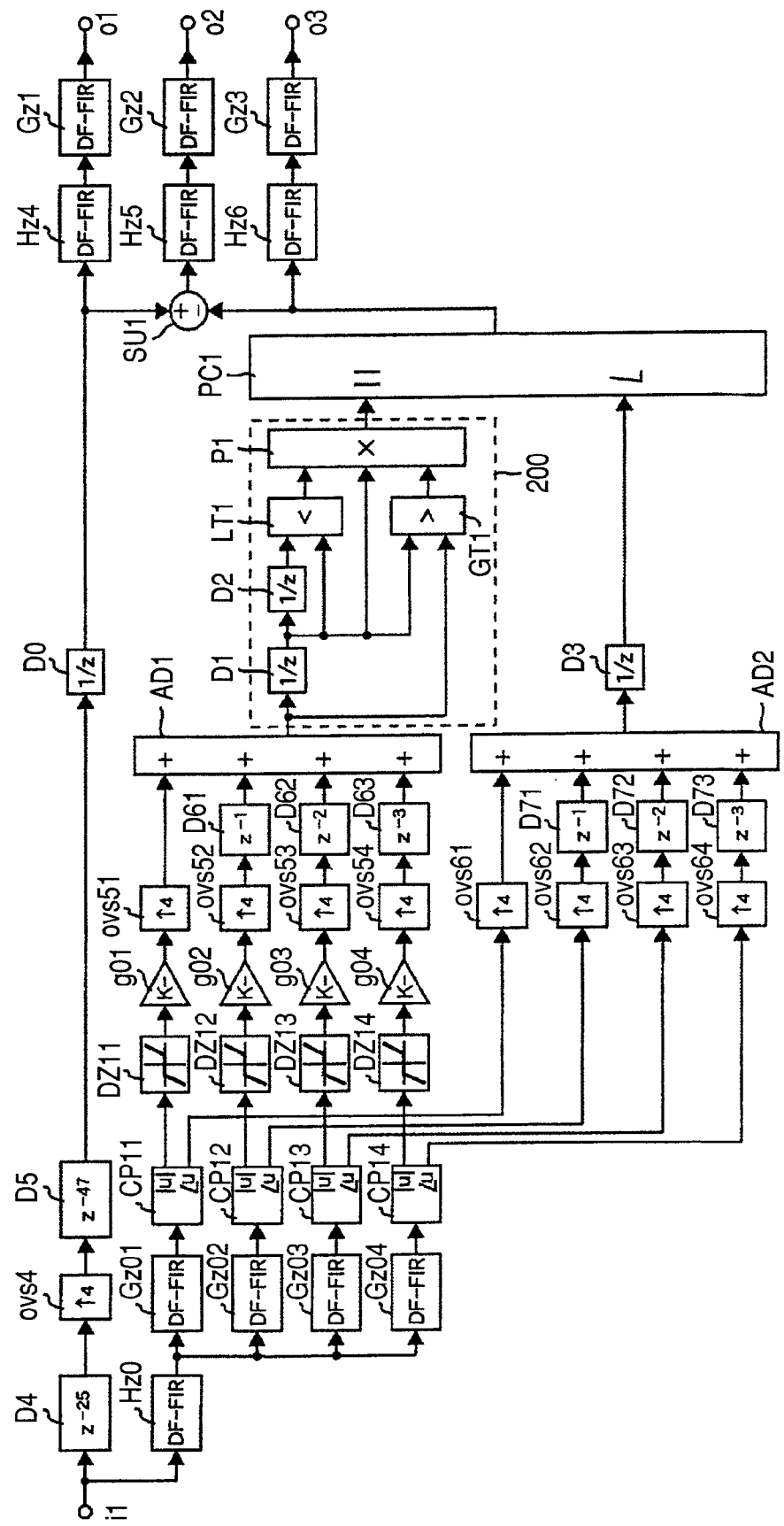
FIG. 5 is a diagram for showing a unit configuration in an intermediate stage, which becomes the peak factor reduction unit shown in FIGS. 1 through 4.
Figure 7:
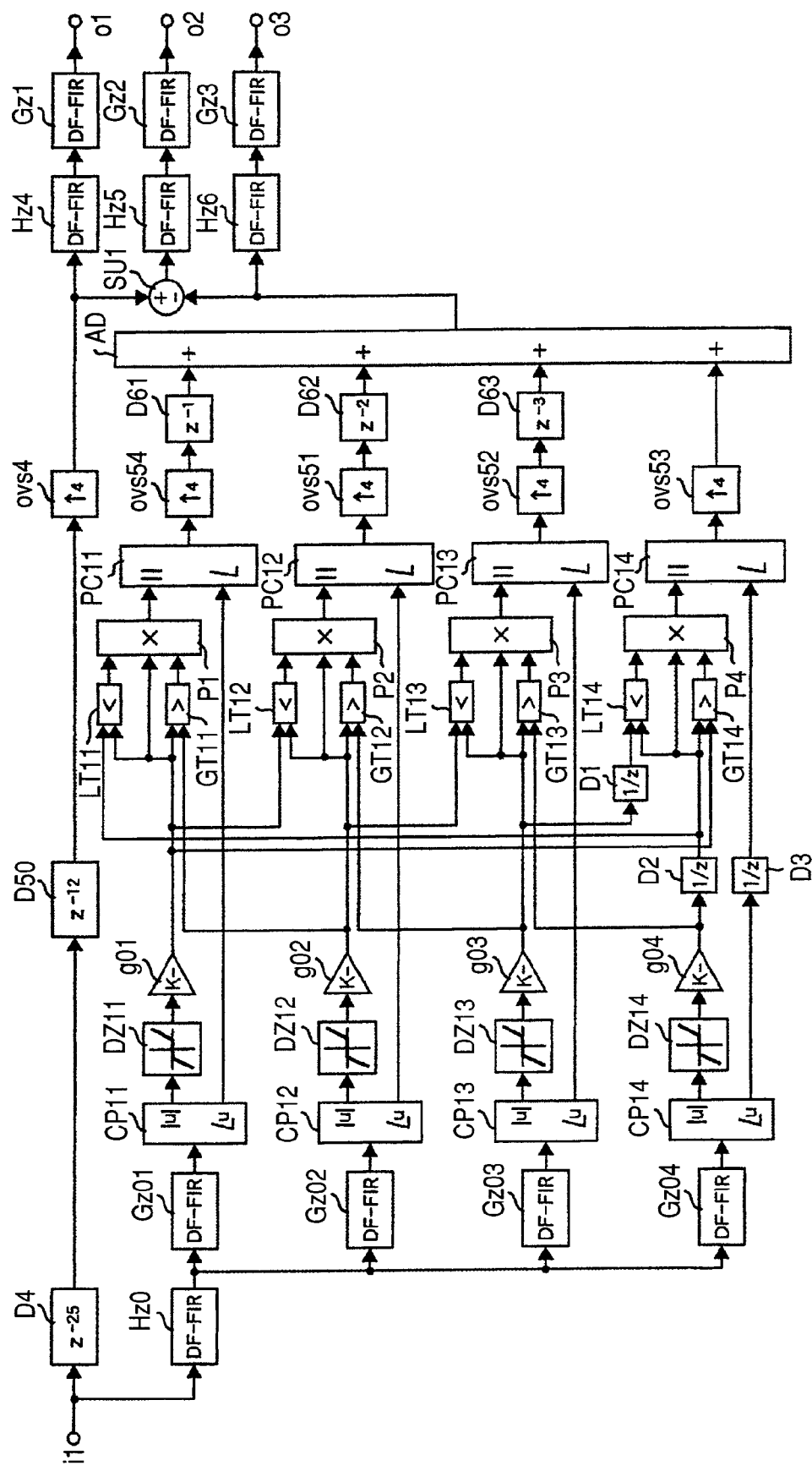
FIG. 7 is a diagram for showing a unit configuration in an intermediate stage, which becomes the peak factor reduction unit shown in FIGS. 4 and 5.
Figure 8A:
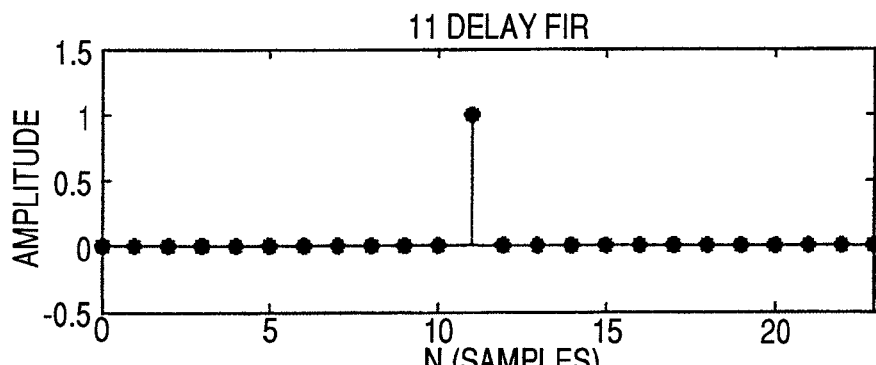
FIGS. 8A-8D are diagrams for showing examples of tap coefficients of a fractional delay FIR filter FD1 for realizing different fractional delay times.
Figure 8B:
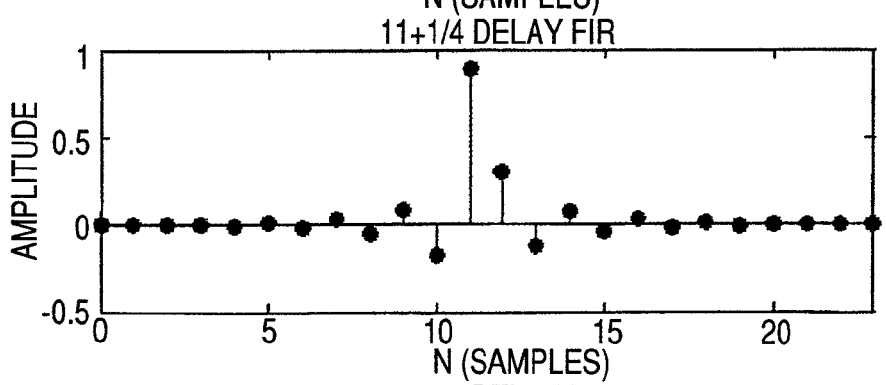
Figure 8C:
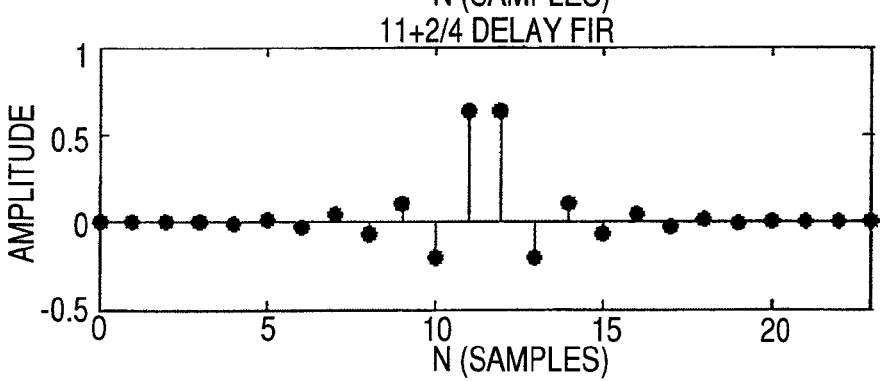
Figure 8D:
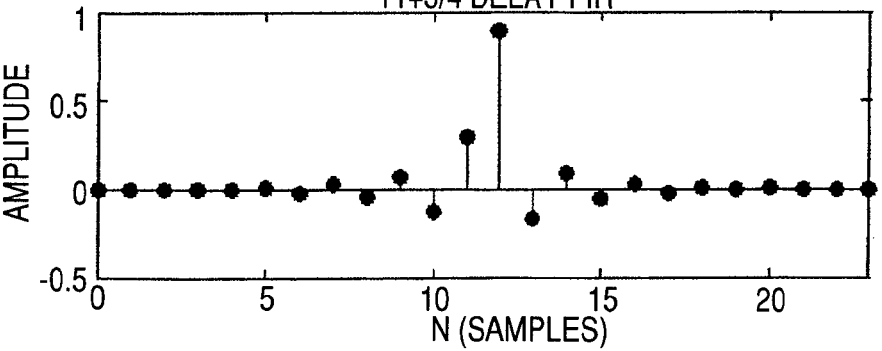

The peak factor reduction unit in this second embodiment has a polyphase structure obtained by carrying out polyphase resolution for the peak factor unit in the first embodiment shown in FIG. 1. The signal response of the unit is equivalent to that in the first embodiment. FIGS. 5 and 7 show configurations of the peak factor reduction unit in intermediate stages, which realize the structures shown in FIGS. 1 through 4.

In the peak factor reduction unit shown in FIG. 1, the interpolation filter Gz0 is transformed so as to have a polyphase structure as shown in FIG. 24B and the polar-coordinates-to-complex CP1, the dead zone circuit DZ1, and the gain block g0 are disposed before the over-sampler ovs5. As a result, the peak factor reduction unit comes to be configured as shown in FIG. 5. Then, the interpolation filter Gz0 is subjected to polyphase resolution, thereby the filter Gz0 is resolved into polyphase filters Gz01 to Gz04. The polar-coordinates-to-complex CP1 is also divided into CP11 to CP14 here. Furthermore, the dead zone circuit DZ1 and the gain block g0 are divided into DZ11 to DZ14 and into g01 to g04 corresponding to CP11 to CP14. The over-sampler ovs5 is divided into the first over-sampler groups ovs51 to ovs54 connected to the gain blocks g01 to g04 and used for amplitude components and into the second over-sampler groups ovs61 to ovs64 used for phase components respectively.

The first over-sampler groups ovs51 to ovs54, as well as the delay units D61 to D63, and the addition unit AD1 work together to input signals from the local maximum value detection unit 200 while the second over-sampler groups ovs61 to ovs64, the delay units D71 to D73, and the addition unit AD2 work together to input signals from the delay unit D3.

Figure 6A:
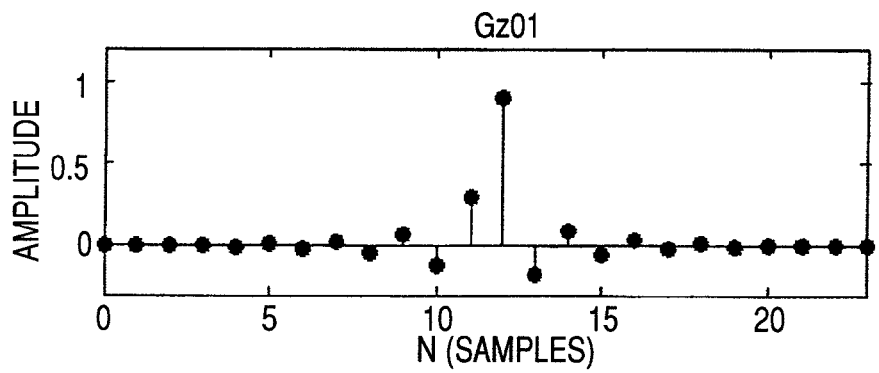
FIGS. 6A-6D are diagrams for showing examples of tap coefficients of polyphase filters Gz01 to Gz04 shown in FIG. 5.
Figure 6B:
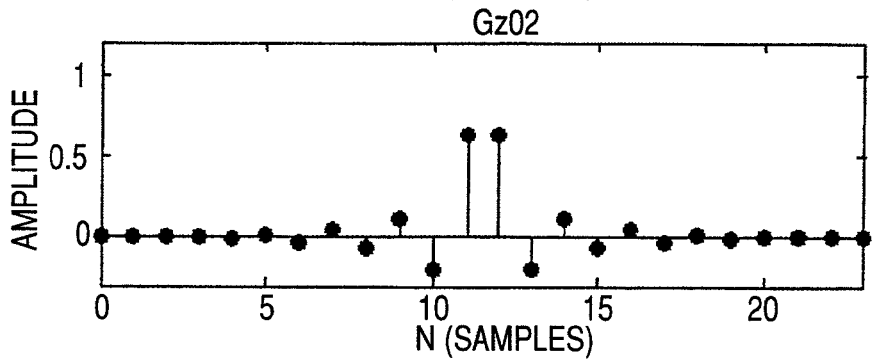
Figure 6C:
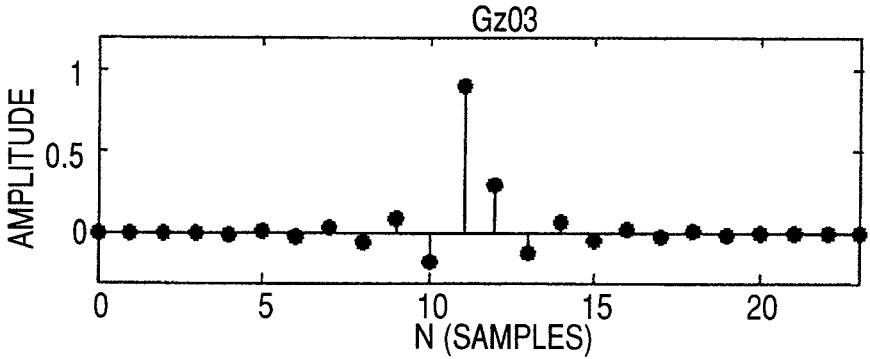
Figure 6D:
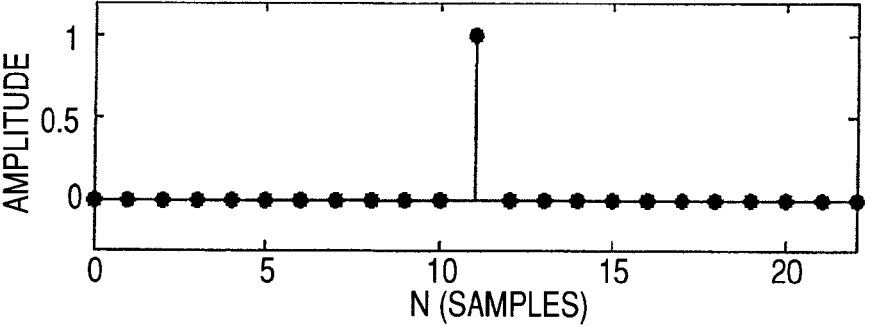

FIGS. 6A through 6D show examples of tap coefficients of the polyphase filters Gz01 to Gz04. For example, if "96" is assumed as the number of taps of the interpolation filter Gz0, the polyphase filter Gz01 is assumed to be a filter having the 1st, the 5th, the 9th, . . . , the 93rd tap coefficients, the polyphase filter Gz02 is assumed to be a filter having the 2nd, the 6th, the 10th, . . . , the 94th tap coefficients, the polyphase filter Gz03 is assumed to be a filter having the 3rd, the 7th, the 11th, . . . , the 95th tap coefficients, and the polyphase filter is assumed to be a filter having the 4th, the 8th, the 12th, . . . , the 96th tap coefficients respectively. Here, the polyphase filter Gz04 has "1" as a center tap coefficient and "0" as each of other coefficients as shown in FIG. 6D. Consequently, in FIG. 4, the polyphase filter Gz04 can be replaced by a simple delay unit ($Z^{-11}$).

Figure 16:
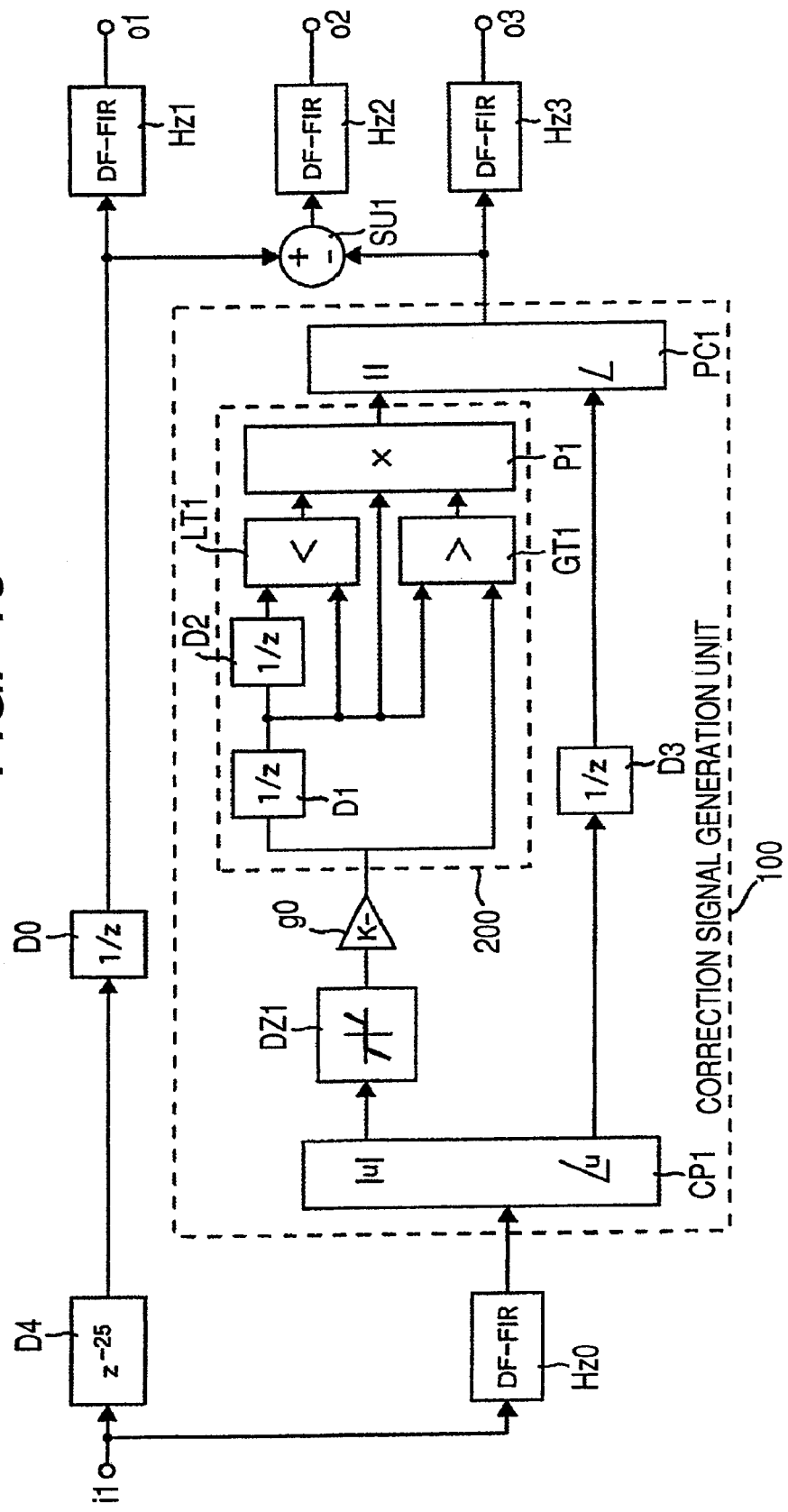
FIG. 16 is a block diagram of a conventional known peak factor reduction unit.
Figure 17A:
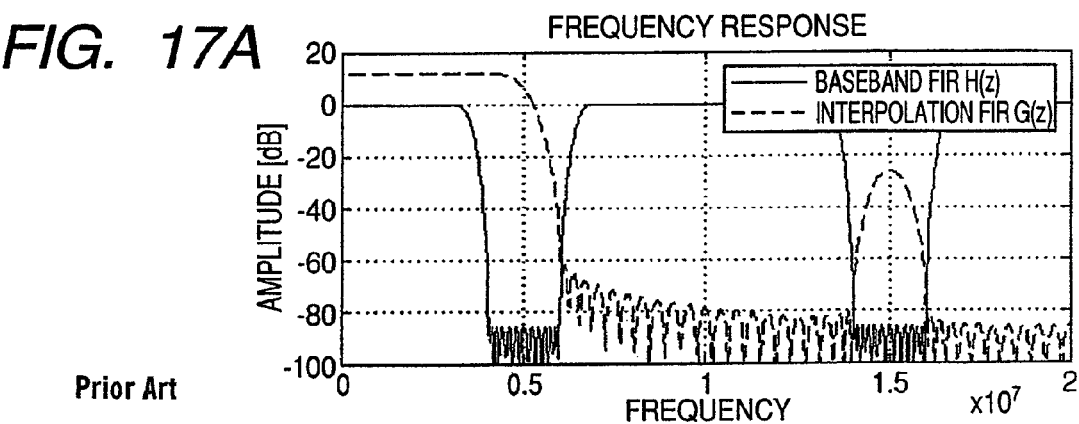
FIG. 17A is a diagram for showing frequency responses of a baseband filter and an interpolation filter.
Figure 17B:
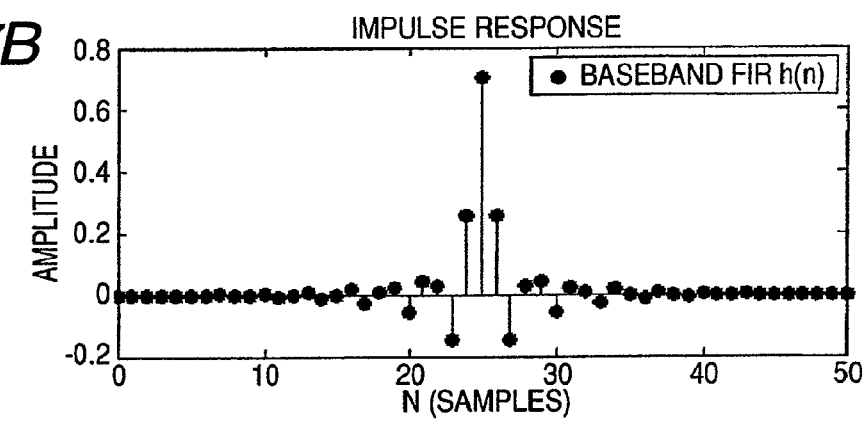
FIG. 17B is a diagram for showing impulse responses of a baseband filter.
Figure 17C:
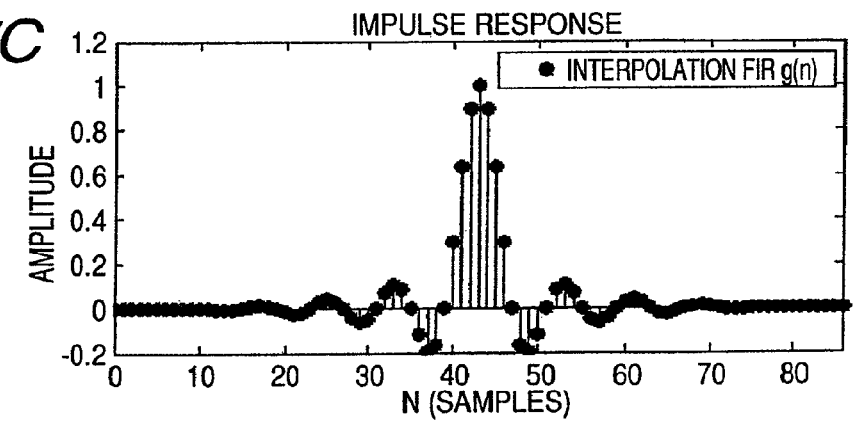
FIG. 17C is a diagram for showing impulse responses of an interpolation filter.
Figure 18A:
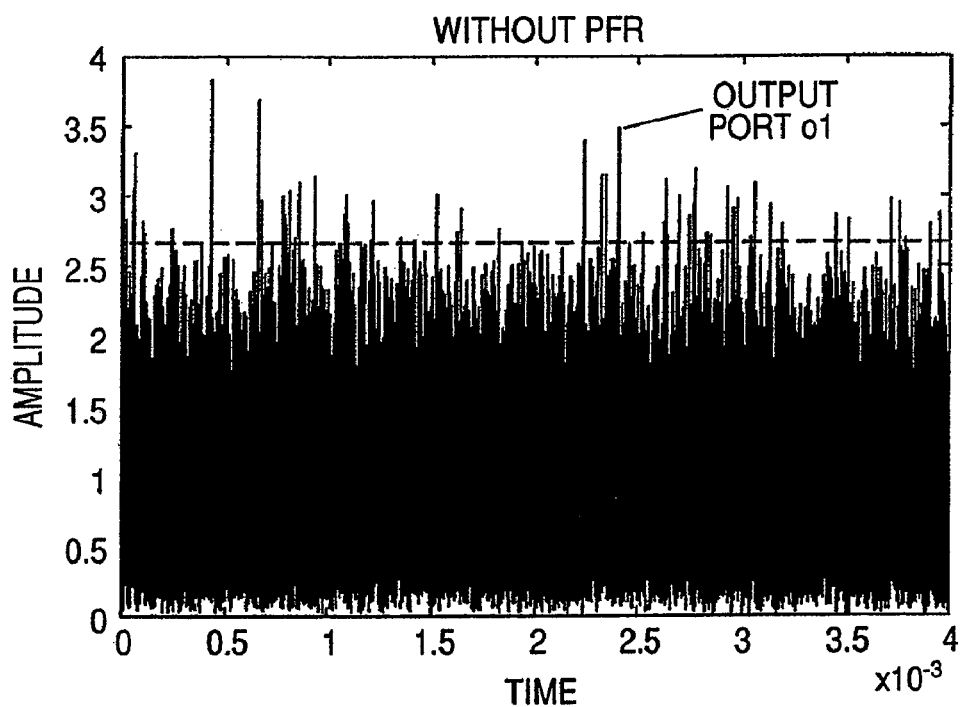
FIG. 18A is a diagram for showing a waveform of a signal observed at the output port o1 and not reduced in peak factor in the peak factor reduction unit shown in FIG. 16.
Figure 18B:
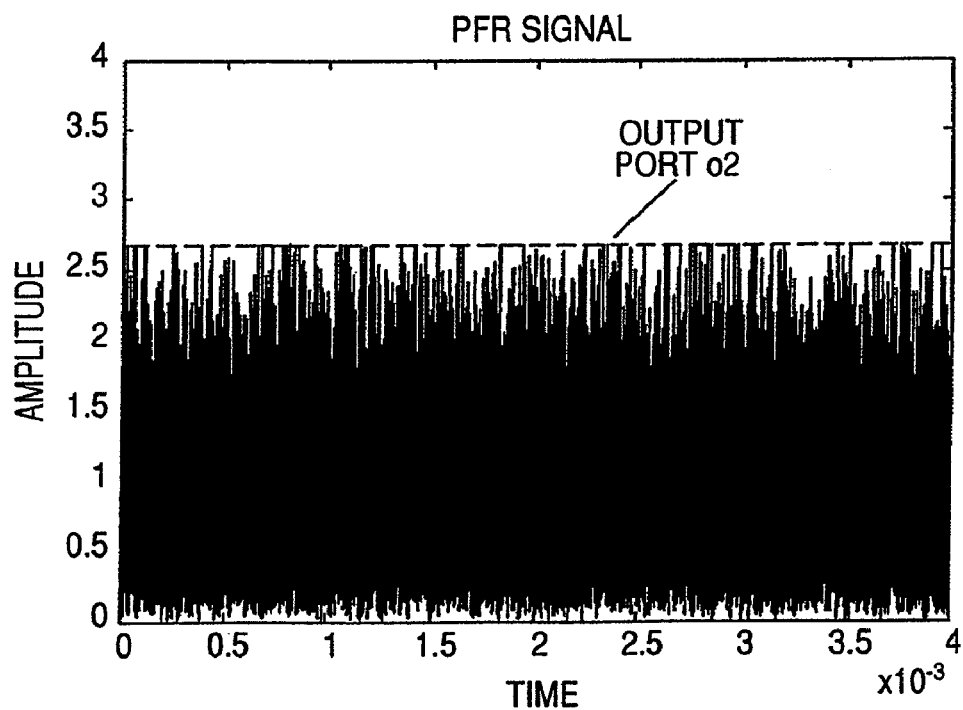
FIG. 18B is a diagram for showing a waveform of a signal observed at the output port o2 and reduced in peak factor in the peak factor reduction unit shown in FIG. 16.
Figure 19A:
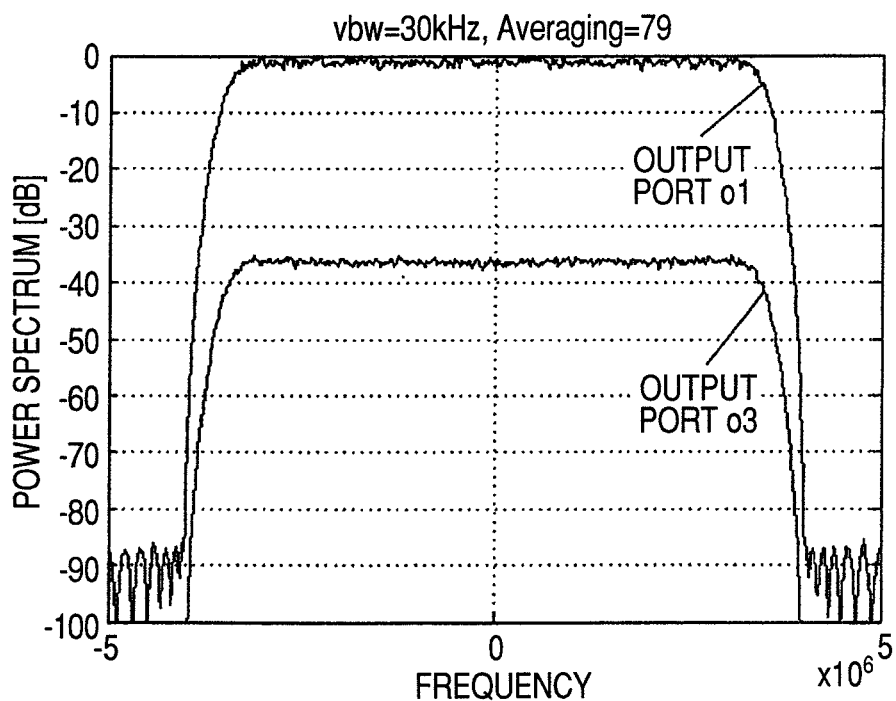
FIG. 19A is a diagram for showing power spectra of a waveform of a signal and a waveform of an injected signal observed at the output ports o1 and o3 and not reduced in peak factor respectively in the peak factor reduction unit shown in FIG. 16.
Figure 19B:
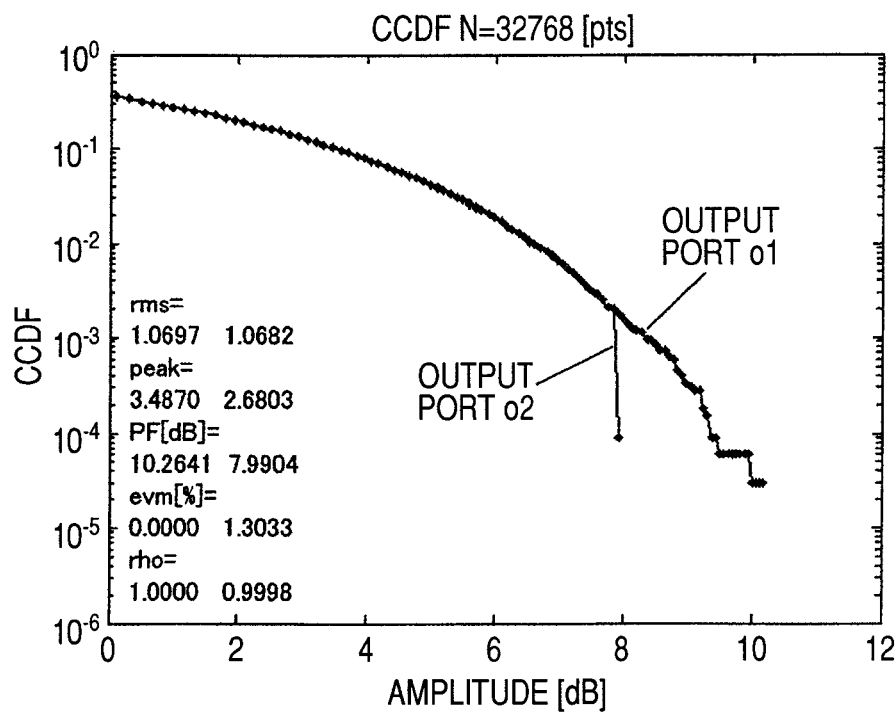
FIG. 19B is a diagram for showing a CCDF observed at each of the output ports o1 and o2 in the peak factor reduction unit shown in FIG. 16.

As described with reference to FIG. 16, the local maximum value detection unit 200 determines the sizes of three consecutive samples with use of the two serially connected delay units D1 and D2. However, in the peak factor reduction unit configuration shown in FIG. 5, polyphase structured gain blocks g01 to g04 output four temporary continued samples in parallel. Consequently, the local maximum value can be detected without using the delay units D1 and D2; it is just required to compare adjacent 3 samples selected from those output from the gain blocks g01 to g04 with each another.

Therefore, the comparison units LT1 and GT1 shown in FIG. 5 and used for detecting local maximum values respectively and the multiplication unit P1 are transformed so as to have a polyphase structure and disposed before the over-samplers ovs51 to ovs54 and the delay units D5 and D0 of the second path are integrated into one delay unit D50 and disposed before the over-sampler ovs4. As a result, the peak factor reduction unit comes to be configured as shown in FIG. 7 in an intermediate stage.

As described above, in the case of 4-time over-sampling, each of the baseband filters Hz5, Hz4, and Hz6 comes to have a transmission function H(z4). The baseband filter Hz5 is subjected again to noble identical transformation to return its transmission function to H(z) and it is disposed before the over-samplers ovs51 to ovs54. Consequently, the peak factor reduction unit in this second embodiment comes to be configured as shown in FIG. 4.

According to this unit configuration, the present invention can adopt a low sample rate assumed before execution of interpolation for most of the functions of the peak factor reduction unit except for those of the delay units D61 to D63, the addition unit DA disposed after those delay units D61 to D64, and the interpolation filters Gz1 to Gz3.

In the transformation from FIG. 1 to FIG. 5 as described above, both of the unit configurations are equivalent. The signal response of the peak factor reduction unit in this second embodiment is the same as that in the first embodiment, so that detailed description for the operation of the unit according to each signal waveform will be omitted here. The interpolation filters Gz1 to Gz3 shown in FIG. 4 can also be subjected to polyphase resolution described with reference to FIG. 24.

Third Embodiment

In the unit configuration shown in FIG. 7, the delay units D61 to D63 connected to the addition unit AD are subjected to noble identical transformation formally and disposed before the over-samplers ovs51 to ovs54. As a result, those delay units D61 to D63 come to have ¼, 2/4, and ¾ delays respectively. Actually, it is impossible to create a delay unit having such a fractional delay time. However, if those delay times may be just required to be approximate, a fractional delay FIR filter can replace those delay units.

The tap coefficient value of the fractional delay FIR filter can be obtained by using a useless detail time D and assume $z = \exp(j\theta)$, then calculating a coefficient value "cn" so as to satisfy the following expression approximately for each of the three ways k=1, 2, and 3. In the following expression, the right side denotes a frequency response having a desired fractional delay and the left side denotes a frequency response of an approximate filter.

$$\sum Cn \overset{T-1}{\underset{n=0}{\exp}}(-jn\theta) \approx \exp(-j(k/4 + D)\theta) \qquad \text{T-1}$$

According to the design parameters assumed here, the baseband cut-off frequency becomes 4 MHz with respect to the sampling frequency 10 NHz and the cut-off frequency, when it is normalized with a Nyquist frequency, becomes 0.8. Therefore, an approximate frequency band range is assumed to be 0 to 0.8 and a range of 0.8 to 1 is assumed as a don't care band. In addition, to prevent appearance of complex coefficients, for example, a target frequency band range is also expanded to the negative side like −0.8'≦shita≦0.8', thereby θ is divided minutely enough and an approximate point is defined, then least squares approximation is carried out for the result.

Because the filter tap length is in a trade-off relationship with a vector error representing an approximate accuracy, it is only required to increase the tap length until a desired accuracy is obtained. As for the above design parameters, a fractional delay FIR filter having the number of taps 24 and a useless delay of 11 has obtained a tap coefficient denoting favorable characteristics.

Figure 9A:
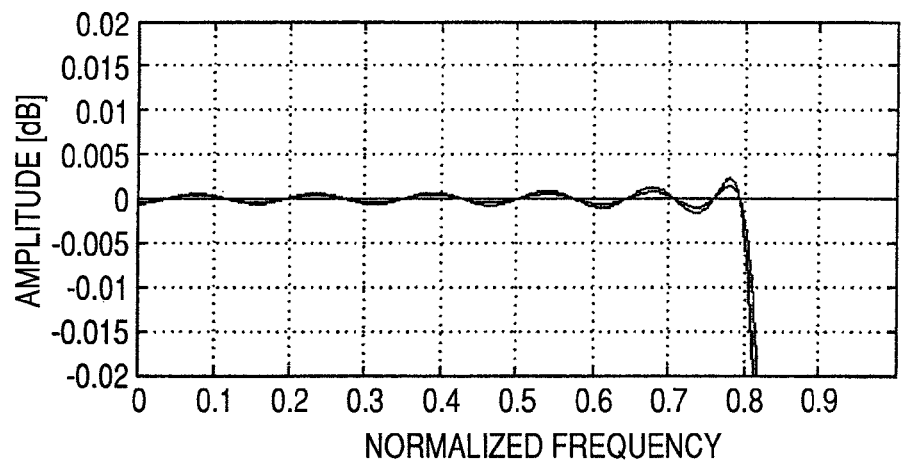
FIG. 9A is a diagram for showing an example of frequency responses of the fractional delay FIR filter FD1.
Figure 9B:
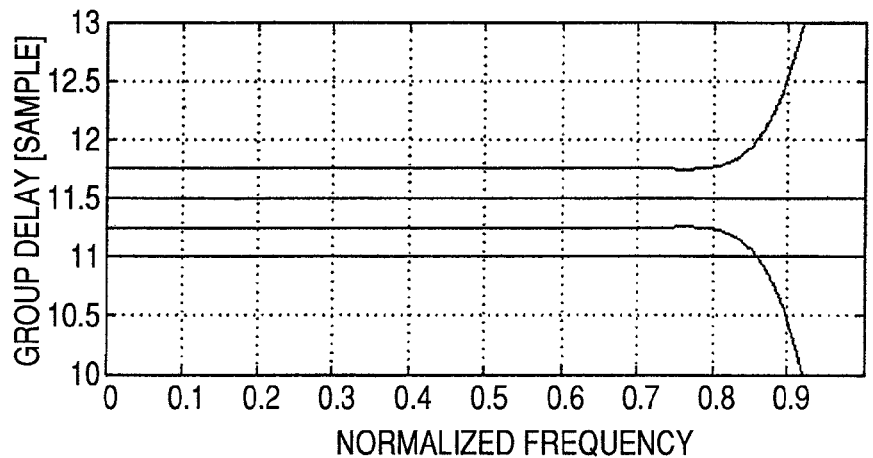
FIG. 9B is a diagram for showing an example of group delays of the fractional delay FIR filter FD1.
Figure 9C:
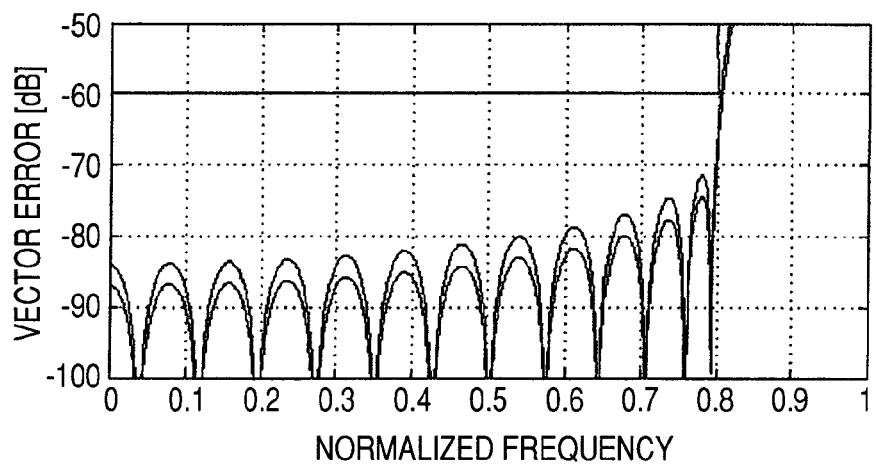
FIG. 9C is a diagram for showing an example of vector errors of the fractional delay FIR filter FD1.

FIGS. 8A, 8B, 8C, and 8D show tap coefficients of delays of "11", "11+¼", "11+²⁄₄", and "11+¾" in a fractional delay FIR filter designed as described above. FIGS. 9Am 9B, and 9C show the frequency response, group delay, and vector error of the fractional delay FIR filter respectively. The vector error is controlled up to an accuracy of −60 dB within a desired band.

Figure 10:
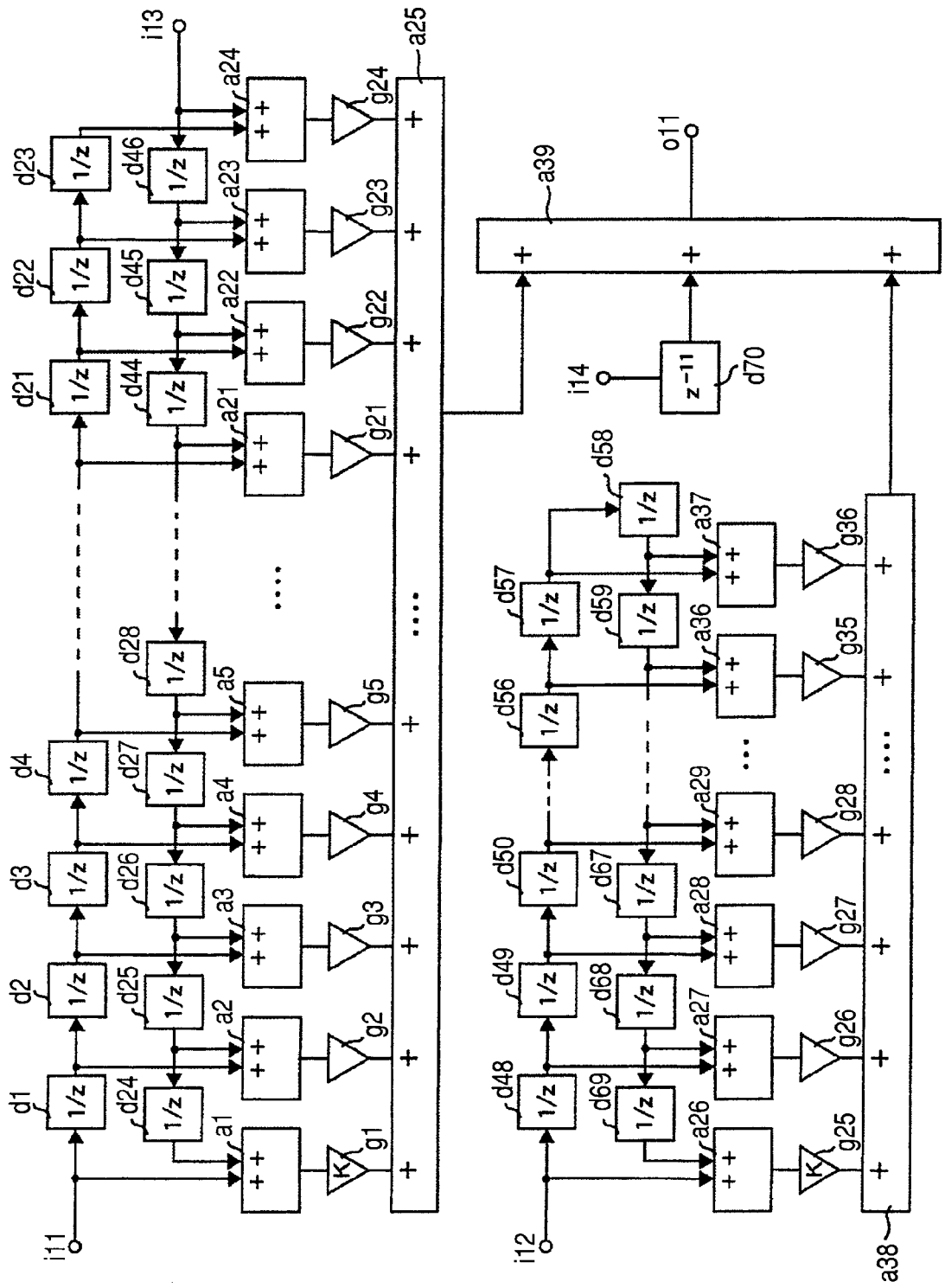
FIG. 10 is a block diagram of a configuration of a fractional delay FIR filter FD1 applied to a peak factor reduction unit in a third embodiment of the present invention.

FIG. 10 shows an example of a configuration of the fractional delay FIR filter FD1. The filter FD1 includes a first delay unit group (d1 to d23) connected to an input port i11, a second delay unit group (d24 to d46) connected to an input port i13, and a third delay unit group (d47 to d69) connected to an input port i12.

The tap outputs of the first and second delay unit groups are inputted to the addition units a1 to a24 combined as shown in FIG. 10 and the output of each addition unit is multiplied by a predetermined gain in one of the gain block g1 to g24. The output from each gain block is inputted to the addition unit a25. The outputs of the third delay unit group are turned back at the delay unit d58 and combined as shown in FIG. 10, then inputted to the addition units a26 to a37. The output of each addition unit is multiplied by a predetermined gain in one of the gain blocks a25 to a36 and the output of each gain block is inputted to the addition unit a38. The outputs from the addition units a25 and a38 are supplied to the addition unit a39 in the final stage together with the output signal from the delay unit d70 connected to an input port i14. This is why a correction signal obtained at the output port o11 of the addition unit a39 can be used for peak factor reduction.

In the above configuration, the input ports i11, i12, i13, and i14 are equivalent to filter inputs realizing delays of "11+¼", "11+²⁄₄", "11+¾", and "11", respectively. Signals are collected where a common tap coefficient is assumed, then the coefficient multiplication is carried out to suppress an increase of the number of multipliers (gain blocks).

Figure 11:
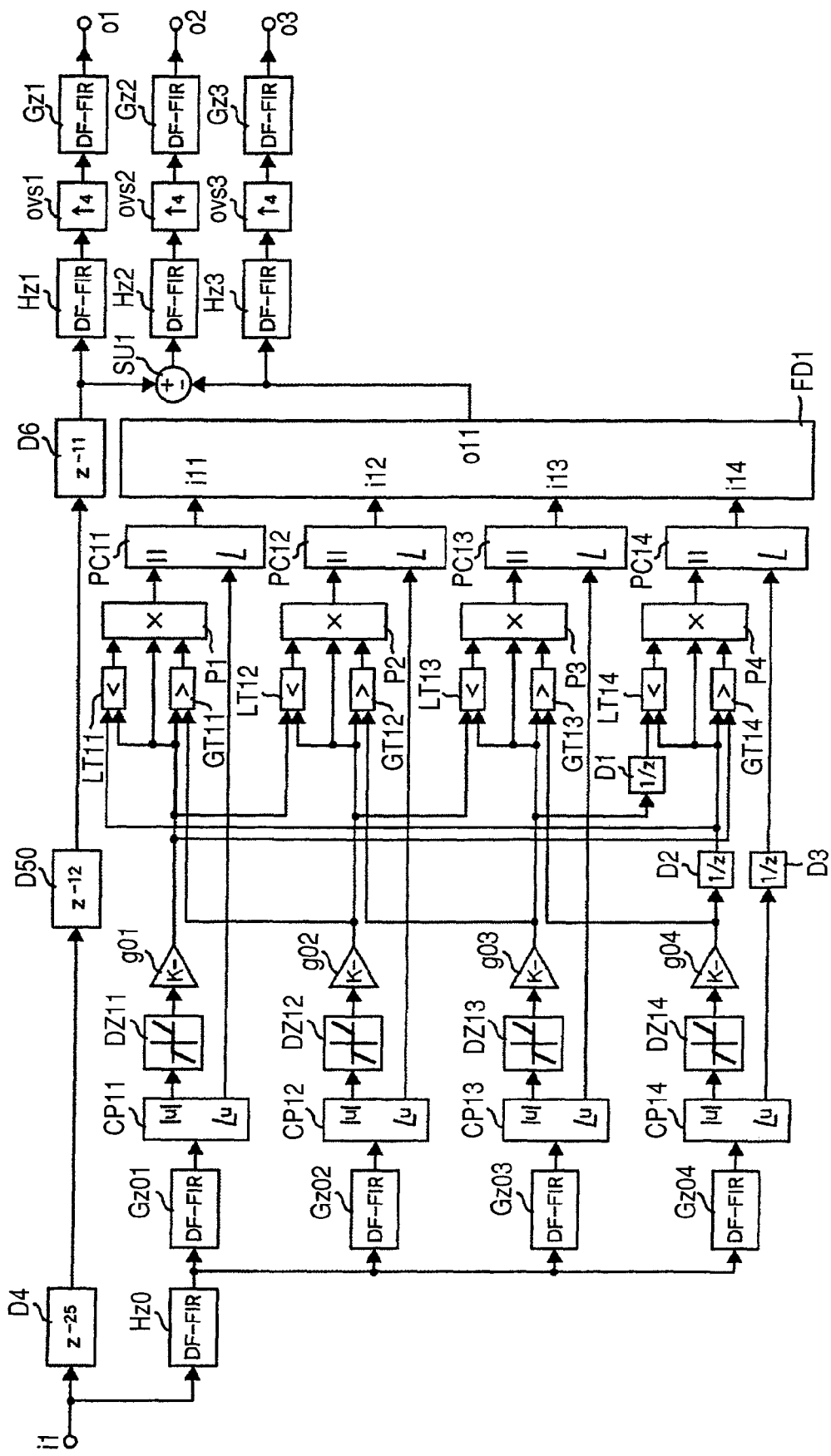
FIG. 11 is a block diagram of the peak factor reduction unit in the third embodiment of the present invention, for which the fractional delay FIR filter FD1 shown in FIG. 10 is applied.

FIG. 11 shows a peak factor reduction unit to which the above fractional delay FIR filter FD1 is used in a third embodiment of the present invention.

In the peak factor reduction unit in this third embodiment, the delay units D61 to D63 shown in FIG. 7 are replaced by a fractional delay FIR filter FD1 and the baseband filters Hz4 to Hz6 having a transmission function H (z4) respectively are replaced by the baseband filters Hz1 to Hz3 having a transmission function H(z) respectively and the over-samplers ovs51 to ovs54 are disposed after the baseband filters respectively. In addition, a delay unit D6 is added at the output side of the delay unit D4 of the second path to synchronize the timings of the output signals of the first and second paths. The delay unit D6 is equivalent to a useless delay ("11" In FIG. 10) of the fractional delay FIR filter FD1.

According to this third embodiment, interpolation filters Gz2 (Gz1 and Gz3) are connected to the output circuit of the baseband filter Hz2 (Hz1 and Hz3) just after the over-sampler ovs2 (ovs1 and ovs3). Consequently, the above described interpolation built-in D/A conversion IC can be used in this portion.

Figure 12A:
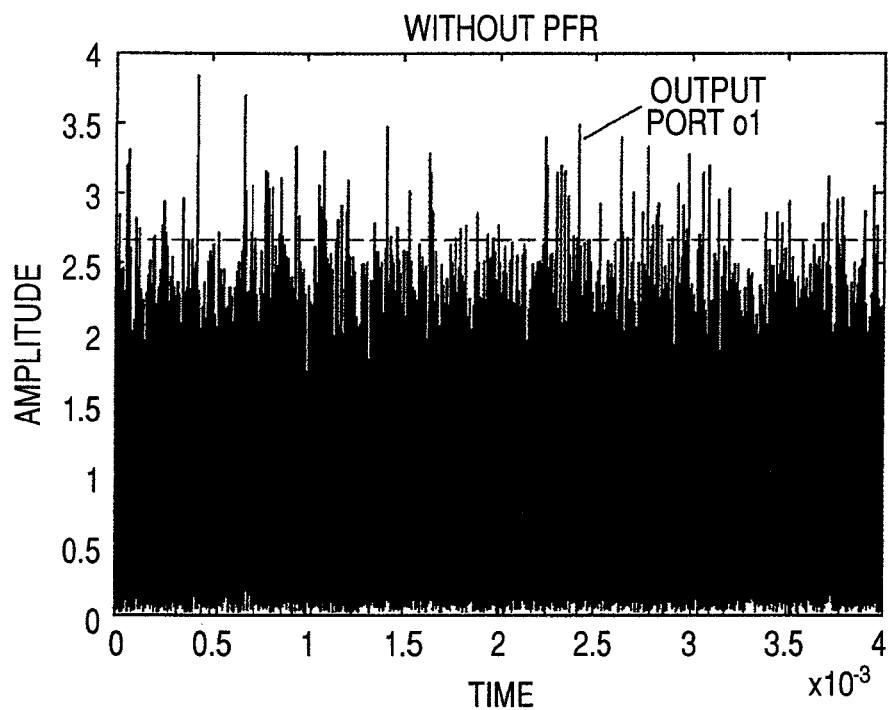
FIG. 12A is a diagram for showing a waveform of a signal observed at the output port o1 and not reduced in peak factor in the peak factor reduction unit in the third embodiment of the present invention.
Figure 12B:
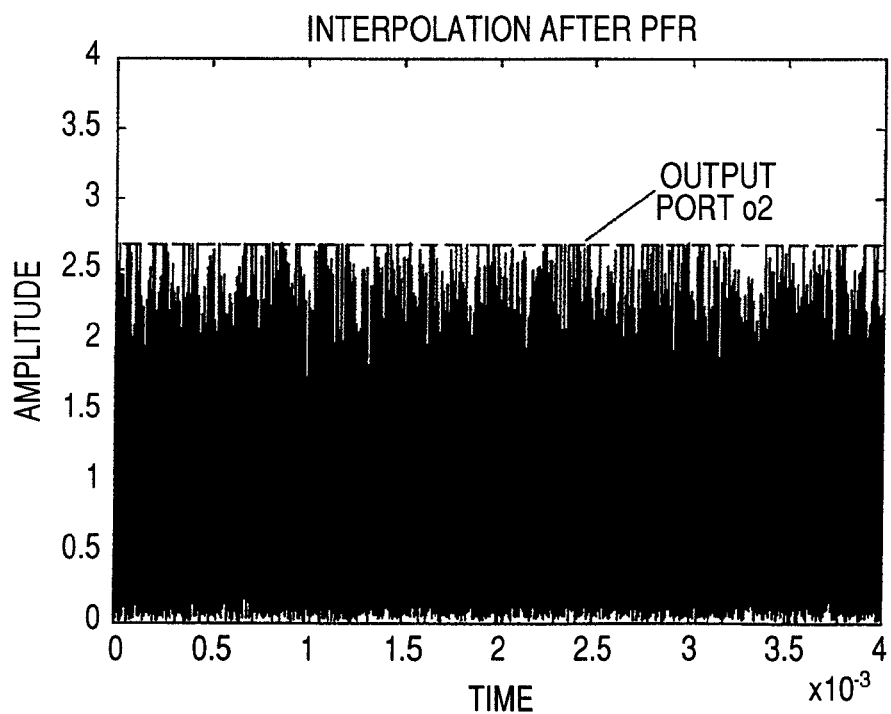
FIG. 12B is a diagram for showing a waveform of a signal observed at the output port o2 and reduced in peak factor in the peak factor reduction unit in the third embodiment of the present invention.
Figure 13A:
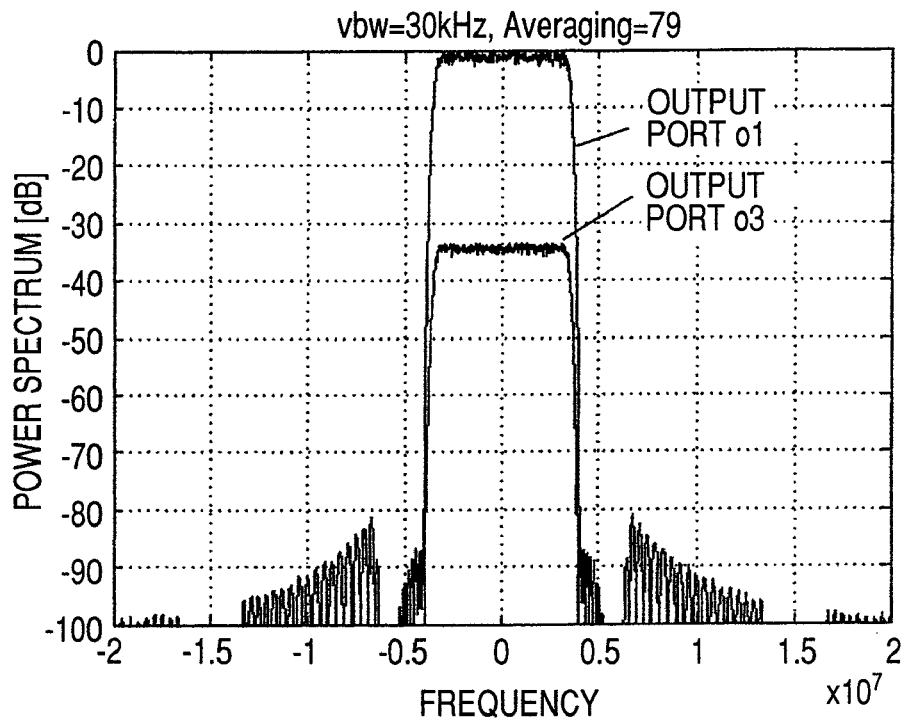
FIG. 13A is a diagram for showing a waveform of a signal and a power spectrum of a waveform of an injected signal observed at the output ports o1 and o3 and not reduced in peak factor respectively in the peak factor reduction unit in the third embodiment of the present invention.
Figure 13B:
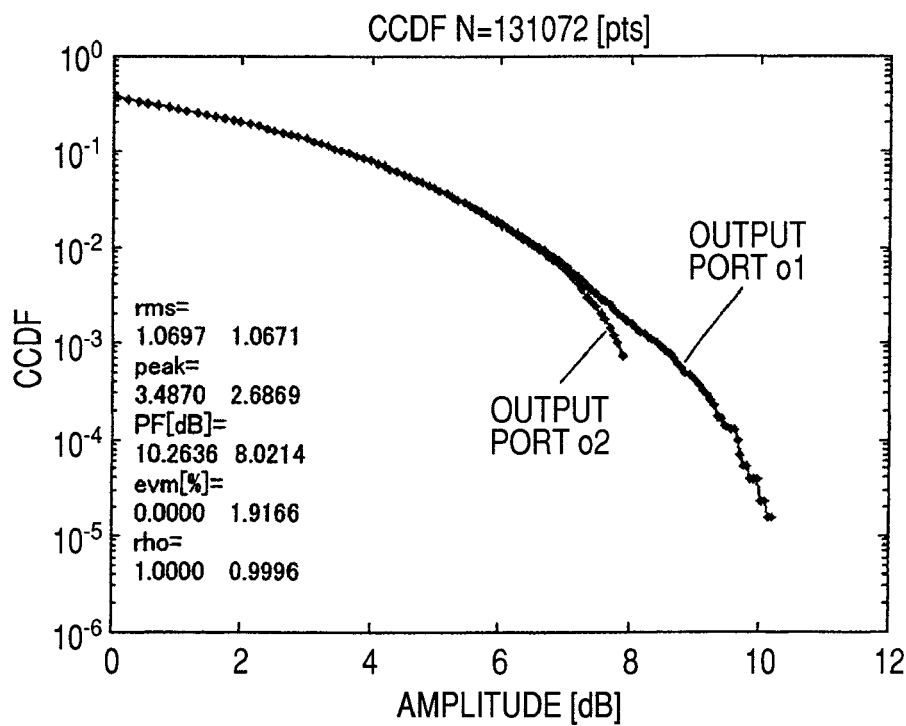
FIG. 13B is a diagram for showing CCDFs observed at the output ports o1 and o2 respectively in the peak factor reduction unit in the third embodiment of the present invention.

FIGS. 12A and 12B show the output waveform amplitude of the output port o1 and the output waveform amplitude of the output port o2 obtained respectively in the simulation in this third embodiment. FIGS. 13A and 13B show the power spectra of the output signal waveforms of the output port o1 and o3 and the CCDFs in the output signals of the output ports o1 and o2 in this third embodiment.

As shown clearly in FIG. 12B, it is confirmed that the peak factor reduction unit in this third embodiment can also obtain clearly peak limited output signals. According to this third embodiment, therefore, while the interpolation filter Gz2 (Gz1, or Gz3) is disposed in the final stage, no peak is reproduced in each output signal waveform as shown in FIG. 12B, thereby this third embodiment can obtain a favorable peak factor reduction effect.

Fourth Embodiment

Figure 14:
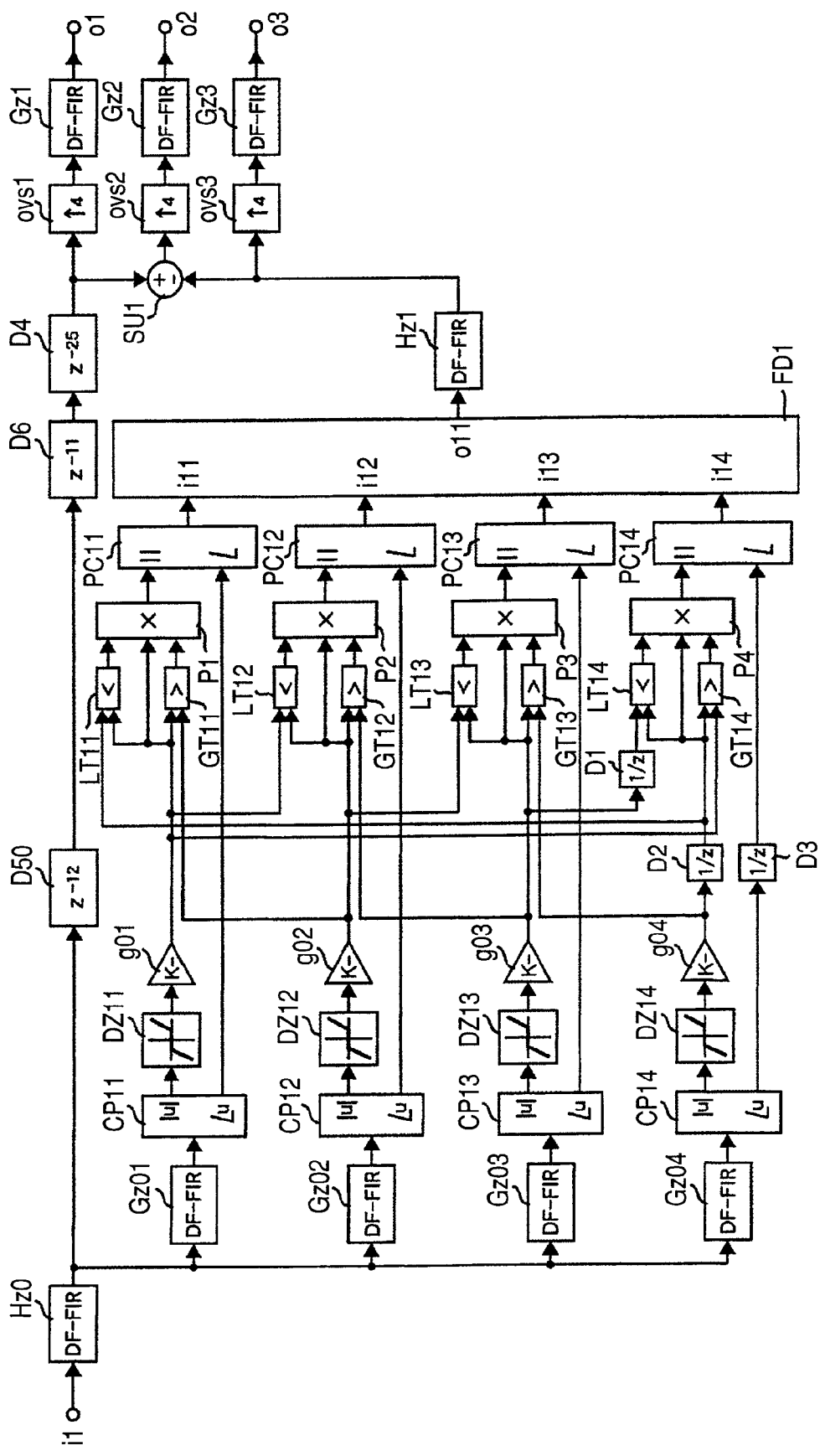
FIG. 14 is a block diagram of a peak factor reduction unit in a fourth embodiment of the present invention.

FIG. 14 shows a peak factor reduction unit in a fourth embodiment of the present invention.

The peak factor reduction unit in this fourth embodiment differs from that in the third embodiment shown in FIG. 11 only in that the position of the baseband filter Hz2 (Hz1 and Hz3) is changed. In this fourth embodiment, the baseband filter Hz2 (Hz1 and Hz3) is disposed before the subtraction unit SU1. However, the baseband filter function is completely equivalent to that in the third embodiment. Also in this configuration, the baseband filter Hz0 for limiting the band of each input signal is separated from the baseband filter Hz1 for limiting the band of each injected signal used for peak factor reduction, so that this configuration is effective particularly for OFDM modulation transmitters.

In the case of OFDM modulation, a properly long zero data part is inserted in an input data string to carry out a reverse FFT processing. An OFDM modulated signal is thus limited in band to a certain extent due to the function of those zero data even when the signal is not passed through a filter. Usually, a baseband filter required for the OFDM is an auxiliary one used to eliminate the residual spectrum of a side robe, so that it has slower cut-off characteristics than the CDMA baseband filter. Consequently, in case where a peak factor of an OFDM modulated signal is reduced in the peak factor reduction unit in the third embodiment, injected signals that appear like impulses are not limited enough in band, thereby the signal spectrum comes to spread. This has been a problem.

In the peak factor reduction unit in the fourth embodiment, however, only the injected signal filter Hz1 is given sharp cut-off characteristics falsely having the spectrum shape of the OFDM, thereby the signal spectrum spread is prevented.

Fifth Embodiment

Figure 15:
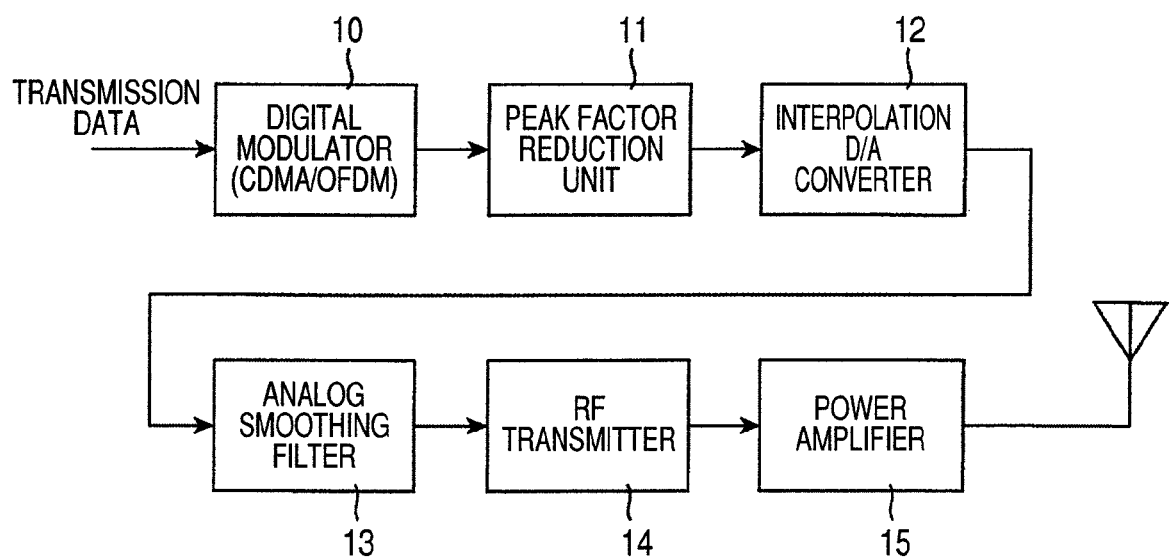
FIG. 15 is a diagram for showing a transmitter portion of a radio communication base station to which a peak factor reduction unit of the present invention is applied.

FIG. 15 shows a configuration of a radio communication base station to which a peak factor reduction unit of the present invention is applied. To simplify the drawing (FIG. 15), functional blocks of, for example, the receiver and the control unit that are not related directly to the present invention are all omitted here; only the transmitter is shown in FIG. 15.

A transmitter carries out such digital modulation as CDMA, OFDN, etc. for input data through a digital modulator 10. A modulated signal has a peak factor that is close to that of a normally distributed one, so that the signal is reduced in peak value in the peak factor reduction unit 11, then inputted to the interpolation D/A conversion IC 12.

The interpolation D/A conversion IC 12 over-samples/interpolates each digital modulated signal inputted from the peak factor reduction unit 11, then converts the signal to an analog signal and output the signal. In this case, the peak factor reduction unit 11 of the present invention carries out peak reduction for each interpolated input signal, so that the interpolation D/A conversion IC 12 never allow peak reproduction that otherwise occurs due to the over-sampling/interpolation.

An alias image of each analog signal output from the IC 12 is eliminated by the analog smoothing filter 13. In this case, the band of the alias image of the above analog signal is far separated from a baseband due to over-sampling, so that it is possible to use an analog smoothing filter 13 having slow cut-off characteristics and a small phase distortion.

Signals output from the analog smoothing filter 13 are converted to high frequency signals in the RF transmitter 14, then amplified to an enough power in the power amplifier 15, then irradiated from an antenna. In this case, signals inputted to the power amplifier 15 are limited in peak value within an allowable range. Thus the signals hardly generate a nonlinear distortion that otherwise occurs due to saturation of the amplification characteristics even when the transmission power is raised in the power amplifier 15. As a result, radio signals can be transmitted with high power efficiency.

What is claimed is:

1. A peak factor reduction unit comprising:
   a first path including a correction signal generation unit for generating a correction signal used for peak factor reduction of a complex input signal supplied as a digital signal;
   a second path including a delay unit used for timing adjustment; and
   a subtraction unit for subtracting said correction signal from said complex input signal branched to said first and second paths, then passed through said delay unit, thereby outputting a complex signal of which peak factor is reduced within an allowable range;
   wherein said first path includes a first baseband filter for limiting a band of a complex input signal supplied to said correction signal generation unit; a first over-sampler for multiplying the number of samples of said complex input signal of which band is limited by said first baseband filter by (n) times (n>2); and a first interpolation filter paired with said first over-sampler;
   wherein said second path includes a second over-sampler for multiplying the number of samples of said complex input signal by (n) times; and
   wherein said correction signal generation unit generates a correction signal used for peak factor reduction from an interpolated complex signal, thereby said subtraction unit outputs said peak factor reduced interpolated complex signal.

2. The peak factor reduction unit according to claim 1;
   wherein said correction signal generation unit includes:
   a first conversion unit for dividing a complex input signal into an amplitude component and a phase component, then outputting an amplitude sample sequence and a phase component sample sequence;
   a first detection unit for detecting a sample value exceeding an allowable range from said amplitude component sample sequence;
   a gain unite for normalizing a sample value detected by said first detection unit with a maximum coefficient value of said first baseband filter;
   a second detection unit for detecting a sample value assumed as a local maximum value from temporary continuing sample values output from said gain unit;
   a first delay unit for delaying said phase component sample sequence output from said first conversion unit according to a signal delay at each of said first and second detection units; and
   a second conversion unit for generating a complex signal assumed as said correction signal from a signal output from said second detection unit and a signal output from said first delay unit.

3. The peak factor reduction unit according to claim 2;
   wherein said first over-sampler and said first interpolation filter are connected serially to each other;
   wherein a signal output from said first interpolation filter is supplied to said correction signal generation unit;
   wherein a signal output from said subtraction unit is inputted to said second interpolation filter paired with said second over-sampler through said second baseband filter; and
   wherein when H(z) is assumed as a transmission function of said first baseband filter, H(z″) is assumed as a transmission function of said second baseband filter.

4. The peak factor reduction unit according to claim 1;
   wherein said first over-sampler and said first interpolation filter are transformed respectively so as to have an n-phase polyphase structure in which an over-sampler is disposed after an interpolation filter in each phase, then disposed between said first baseband filter and said subtraction unit.

5. The peak factor reduction unit according to claim 1;
   wherein said first over-sampler and said first interpolation filter are transformed respectively so as to have a polyphase structure consisting of a plurality of n-phase interpolation filters, in which an over-sampler is disposed after an interpolation filter in each phase, then disposed between said first baseband filter and said subtraction unit;
   wherein said correction signal generation unit is divided into a plurality of n-phase correction signal generation units, each being disposed between each-phase interpolation filter having said polyphase structure and an over-sampler;
   wherein each correction signal generation unit in said n-phase generates a correction signal with use selectively of temporary continuing samples output in parallel from said plurality of n-phase interpolation filters.

6. A peak factor reduction unit comprising:
   a first baseband filter for limiting a band of a complex input signal supplied as a digital signal;
   a first path including a correction signal generation unit for generating a correction signal used for peak factor reduction;
   a second path including a delay unit used for timing adjustment; and
   a subtraction unit for subtracting said correction signal from said complex input signal branched to said first and second paths, then passed through said delay unit, thereby outputting said complex signal of which peak factor is reduced within an allowable range;
   wherein said first path includes a first over-sampler for multiplying the number of samples of said complex input signal by (n) times and a first interpolation filter paired with said first over-sampler, both of which being transformed respectively so as to have a polyphase structure consisting of a plurality of n-phase interpolation filters, in each of which an over-sampler is disposed after an interpolation filter;

wherein said correction signal generation unit is divided into a plurality of n-phase correction signal generation units and each of which is disposed between each of said polyphase-structured n-phase interpolation filters and an over-sampler and each n-phase correction signal generation unit generates a correction signal with use selectively of temporary continuing samples output in parallel from said plurality of n-phase interpolation filters;

wherein a correction signal generated in each of said polyphase structured n-phase interpolation filters is subjected to band limitation in a second baseband filter, then supplied to each over-sampler and an output of each over-sampler is inputted to an addition unit provided in a final stage of said polyphase structure with a time delay that differs among interpolation filters;

wherein said second path includes a second over-sampler for multiplying the number of samples of said complex input signal by (n) times; and wherein said subtraction unit is supplied an output signal of said second path and said interpolated correction signal output from said polyphase structure final stage.

7. The peak factor reduction unit according to claim 6;

wherein an output signal of said subtraction unit is inputted to said second interpolation filter paired with said second over-sampler.

8. A peak factor reduction unit for outputting a complex signal of which peak factor is reduced within an allowable range, comprising:

a first path including a correction signal generation unit for generating a correction signal used for peak factor reduction of a complex input signal supplied as a digital signal;

a second path including a delay unit used for timing adjustment; and a subtraction unit for subtracting said correction signal from said complex input signal branched to said first and second paths, then passed through said delay unit;

wherein said first path includes a first baseband filter for limiting a band of a complex signal supplied to said complex signal generation unit and an n-phase interpolation filter having a polyphase structure in which an over-sampler is disposed after each n-phase interpolation filter;

wherein said correction signal generation unit is divided into a plurality of correction signal generation units and each of which is connected to each n-phase interpolation filter having said polyphase structure;

wherein each of said n-phase correction signal generation units generates a correction signal with use selectively of temporary continuing samples output in parallel from said plurality of n-phase interpolation filters;

wherein said n-phase correction signal generated in each of said plurality of correction signal generation units is given an approximate fractional delay time that differs among n-phase interpolation filters, then inputted to a digital filter for synthesizing n-phase correction signals into one correction signal;

wherein said subtraction unit is supplied a signal output from said second path and a correction signal output from said digital filter.

9. The peak factor reduction unit according to claim 8;

wherein an output signal of said subtraction unit is supplied to a second sampler and a second interpolation filter paired with said second over-sampler through a second baseband filter for limiting a band of said output signal respectively.

10. The peak factor reduction unit according to claim 8;

wherein a second baseband filter for limiting a band of a correction signal output from said digital filter is provided between said digital filter and said subtraction unit.

11. A baseband signal processing system including a peak factor reduction unit according to claim 8, as well as an interpolation function built-in D/A conversion IC for inputting an output signal of said peak factor reduction unit.

* * * * *